United States Patent
Namba et al.

(10) Patent No.: US 8,580,159 B2
(45) Date of Patent: *Nov. 12, 2013

(54) INK FOR INKJET RECORDING, INK SET FOR INKJET RECORDING, INK MEDIA SET FOR INKJET RECORDING, INK CARTRIDGE, INKJET RECORDING METHOD, AND INKJET RECORDING APPARATUS

(75) Inventors: Michihiko Namba, Yokohama (JP); Akihiko Matsuyama, Isehara (JP); Naoya Morohoshi, Numazu (JP); Tohru Ohshima, Atsugi (JP); Masayuki Koyano, Zama (JP); Akihiko Gotoh, Atsugi (JP); Kiyofumi Nagai, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/545,576

(22) Filed: Jul. 10, 2012

(65) Prior Publication Data

US 2012/0320133 A1 Dec. 20, 2012

Related U.S. Application Data

(62) Division of application No. 12/094,235, filed as application No. PCT/JP2007/067361 on Aug. 30, 2007, now Pat. No. 8,252,207.

(30) Foreign Application Priority Data

Sep. 15, 2006 (JP) .................................. 2006-251771
Sep. 15, 2006 (JP) .................................. 2006-251880

(51) Int. Cl.
*H01B 1/12* (2006.01)
*G01D 11/00* (2006.01)

(52) U.S. Cl.
USPC ...................... 252/521.6; 252/511; 252/521.5; 427/511; 427/256; 347/100

(58) Field of Classification Search
USPC ............ 252/521.6, 511, 521.5; 427/511, 256; 347/100
See application file for complete search history.

(56) References Cited

U.S. PATENT DOCUMENTS

| 7,086,726 | B2 | 8/2006 | Takashima et al. | |
|---|---|---|---|---|
| 7,284,851 | B2 | 10/2007 | Bannai et al. | |
| 7,810,919 | B2 | 10/2010 | Kojima et al. | |
| 7,892,340 | B2 * | 2/2011 | Namba et al. | 106/31.89 |
| 8,192,009 | B2 * | 6/2012 | Yokohama et al. | 347/100 |
| 8,317,913 | B2 * | 11/2012 | Hatada et al. | 106/31.59 |
| 2004/0080595 | A1 | 4/2004 | Taguchi et al. | |
| 2004/0246321 | A1 | 12/2004 | Takashima et al. | |
| 2005/0004261 | A1 | 1/2005 | Yatake | |
| 2005/0090599 | A1 | 4/2005 | Spinelli | |
| 2007/0221078 | A1 | 9/2007 | Namba et al. | |
| 2008/0070008 | A1 | 3/2008 | Namba et al. | |
| 2008/0103245 | A1 * | 5/2008 | Endo et al. | 524/543 |
| 2009/0202753 | A1 * | 8/2009 | Teramae et al. | 428/32.2 |
| 2010/0271435 | A1 | 10/2010 | Kojima et al. | |
| 2010/0279035 | A1 | 11/2010 | Namba et al. | |
| 2011/0092610 | A1 | 4/2011 | Habashi et al. | |
| 2011/0216123 | A1 | 9/2011 | Tamai et al. | |
| 2012/0154492 | A1 * | 6/2012 | Hakiri et al. | 347/86 |
| 2013/0169724 | A1 * | 7/2013 | Gotou | 347/100 |

FOREIGN PATENT DOCUMENTS

| JP | 9 188066 | 7/1997 |
|---|---|---|
| JP | 11 78225 | 3/1999 |
| JP | 2002 321449 | 11/2002 |
| JP | 2003 25717 | 1/2003 |
| JP | 2004-217826 | 8/2004 |
| JP | 2005 15795 | 1/2005 |
| JP | 2005 89713 | 4/2005 |
| JP | 2005 212327 | 8/2005 |
| JP | 2005 272790 | 10/2005 |
| JP | 2006 45436 | 2/2006 |
| JP | 2006 83243 | 3/2006 |
| JP | 2006 117634 | 5/2006 |
| JP | 2006 122900 | 5/2006 |
| WO | WO 2006083032 A1 * | 8/2006 |

OTHER PUBLICATIONS

Webster's New Universal Unabridged Dictionary, Barner & Noble, Inc., 1992, p. 738.
Office Action issued Dec. 15, 2011, in Japan Patent Application No. 2006-251880.

\* cited by examiner

*Primary Examiner* — Douglas McGinty
(74) *Attorney, Agent, or Firm* — Oblon, Spivak, McClelland, Maier & Neustadt, L.L.P.

(57) ABSTRACT

An ink for inkjet recording containing water, water-soluble organic solvent, water-dispersible resin, fluorochemical surfactant or derivative thereof, and coloring agent containing pigment, where the ink has a surface tension of 20-35 mN/m and viscosity of ≥5 mPa·s at 25° C., total amount of the water-dispersible resin and the coloring agent in the ink is 5-40% by mass, and mass ratio A/B of the water-dispersible resin A to the coloring agent B is 0.5-4, where the ink is applied to a recording medium containing a support containing cellulose pulp, and one or more barrier layers disposed on a face of the support, and where the barrier layer contains ≥30% by mass of inorganic pigment having refractive index of ≥1.5, excluding aluminum hydrate, and ≤10% by mass of inorganic pigment having a refractive index of <1.5.

20 Claims, 6 Drawing Sheets

INK FOR INKJET RECORDING, INK SET FOR INKJET RECORDING, INK MEDIA SET FOR INKJET RECORDING, INK CARTRIDGE, INKJET RECORDING METHOD, AND INKJET RECORDING APPARATUS

CROSS REFERENCE TO RELATED APPLICATION

This application is a divisional application of U.S. application No. 12/094,235, filed on May 19, 2008, now U.S. Pat. No. 8,252,207, which is a 371 of PCT/JP2007/067361, filed on Aug. 30, 2007, and claims priority to the following Japanese Patent Applications: 2006-251771 filed on Sep. 15, 2006; and 2006-251880, filed on Sep. 15, 2006.

TECHNICAL FIELD

The present invention is directed to an ink for inkjet recording, ink set for inkjet recording, ink media set for inkjet recording, ink cartridge, inkjet recording method, and inkjet recording apparatus, which realize recordings of high quality images by an inkjet system, and those quality of images close to that of commercial printing such as off-set printing.

BACKGROUND ART

Inkjet recording has been known as an excellent recording method in which substantially any recording media (hereinafter, the recording media may also be referred to as "a recording medium", "inkjet paper", "recording media for inkjet recording" or "media") can be applied, and it has been extensively studied and improved in terms of a recording apparatus, recording method, and recording medium thereof. In the art, the widely used ink for inkjet recording is the one which contains water as a main component, and an aqueous dye. The reason for the large demand in such the ink is that this ink uses easily obtainable dyes having high absorption coefficient and high color purity, handling of this ink is very easy when the ink is made in multiple colors for purpose of widening the range of color tones thereof, and the ink can be made so as to have good long-term storage stability and high heat resistance stability, and especially to prevent deterioration or blockage of a thermal head as a result of the ink being suffered from a heat from a heater for a long period.

Conventional inkjet papers, especially gloss media for inkjet printing, are classified into mainly two types, a swollen type and a porous type. Recently, the porous type media have been widely used since they excel in drying speed of the ink. The structure of the typical porous media is such that onto a support, there is provided an ink absorbing layer having pores so as to take the ink therein, and porous glossy layer is optionally provided on the ink absorbing layer. For example, Patent Literatures 1 and 2 disclose a porous medium which is obtained by applying, onto a support, a coating liquid wherein silica and aluminum hydrate are dispersed therein to form one or more layers, and optionally applying a coating liquid containing colloidal silica so as to form a glossy layer containing a large amount of the colloidal silica. This medium is so designed as to match a dye ink which is currently mainly used in inkjet recording, and is widely used as a medium for inkjet printing, especially as a glossy paper. This paper realizes an output image with high gloss and of extremely precise details. However, it also has drawbacks such that raw materials thereof are very expensive, and the production process for this type of paper is very complicated. Therefore, a production cost for the paper is extremely high compared to a glossy coated paper for general commercial printing. For this reason, use of this paper is limited to cases where high quality output images are required, such as outputting of photography or the like, and it is hardly used in the field of the commercial printings which need large numbers of outputting at low cost, such as flyers, catalogs, brochures, and the like. Moreover, there is a demand for improving the ink absorption capability since the numbers of colors of the ink for use are getting larger for obtaining higher quality of images. In order to improve the ink absorption capability, a thickness of an ink accepting layer, i.e. a coated layer, needs to be increased. However, if the thickness is increased, a larger quantity of expensive materials is required. Therefore, there is a problem such that a cost required for producing each medium is increased.

A pigment used in the ink absorbing layer, i.e. the ink accepting layer, needs to have a low refractive index and opacity which allow to maintain high transparency of the ink absorbing layer, and needs to have large oil absorption or specific surface area. Therefore, it is necessary to add a large amount of expensive pigments having a low refractive index and high oil absorption, such as silica and aluminum hydrate, not inexpensive white pigments such as calcium carbonate, kaolin, and the like. When the ink absorbing layer contains pigments having low transparency and high opacity, a coloring material contained in the ink absorbed in the ink absorbing layer is concealed by such pigments, and thus a high coloring density cannot be obtained. In the case where inkjet recording is carried out by using a paper containing such pigments of high opacity together with an ink containing a dye, the color density of the resulted image is corresponding to only the coloring material present in the surface area of the paper even though the amount of the ink to be ejected is increased. Therefore, the resulted image has low color density on the whole, and has low contrast. In the case where the pigment having low oil absorption is used in a paper, the absorption of the ink cannot be carried out sufficiently, and thus bleeding tends to occur.

In order to resolve the above-mentioned problems, Patent Literature 3 proposes to use fine organic particles having a low refractive index so as to realize both the desirable refractive index and whiteness. However, the organic fine particles still lead to high production cost, and thus it is yet difficult to attain a recording medium designed for an ink containing a dye, at low cost.

Moreover, as a design for improving a long-term stability of a printed image, a main stream idea is to penetrate a dye into an ink-accepting layer as deep as possible so as to block influences from air or ultraviolet ray as much as possible, and to protect the dye by using an antioxidant, or a stabilizer which are originally present within the ink accepting layer, since the dye molecule has low resistance to ultraviolet rays and ozone. Therefore, a deep penetration is realized by using a large amount of an ink having a relatively low content of the coloring agent, so as to maintain image reliability. To this end, an amount of the ink necessary for outputting an image is automatically increased. Therefore, down-sizing of a cartridge is difficult to realize, as well as increasing a cost for recording.

Under these circumstances, in inkjet recording, it is still difficult to provide a recording medium for inkjet recording and a recording method which output high quality images at low cost.

In recent years, attentions have been drawn to a pigment ink for inkjet recording. The pigment is insoluble to water, and thus the pigment is generally dispersed in a solvent in the form of fine particles. In view of safety, a pigment ink wherein the pigment is dispersed in water is mainly used in the art. However, such pigment ink has drawbacks as mentioned hereinafter. The aqueous pigment ink tends to cause more aggregations or precipitation of the pigment particles, compared to a dye ink. In order to improve long-term storage stability to the same degree to that of the dye ink, various conditions for dispersion or additives are required. The dispersion stabilizer however becomes a factor for causing a blockage of a thermal head as a result of the ink being suffered from a heat from a heater for a long period. Therefore, such ink is not suitably used with a thermal head. Moreover, the pigment ink is inferiors to a dye ink in a color specification range of coloring agents. Although the pigment ink has these drawbacks, it has been popular in view of storage stability after recording, water-resistance, and image reliability such that high color density of black can be attained. It is considered that an inkjet printer using the pigment ink enables to realize the prints having the improved textures to the level of those of commercial printing, as the coloring agents used therein are close to those of general commercial printing. However, when printing is actually performed on a coated paper for commercial printing by using the conventional pigment ink, drying speed of the ink is not sufficiently high. This poor drying property causes problems such that an image is spread or blurred, the pigment is not fixed at all after drying, abrasion occurs, and the like. Therefore, in reality, the pigment ink can be used only for printing of media having high absorption of an ink, such as a normal paper, a recording paper for inkjet recording, and the like. This is because the designing concept of an inkjet image using the pigment ink has not changed from that of an inkjet image using the dye ink, the pigment coloring agent is considered only as a dye having a high light fastness, and the characteristics of the pigment ink are disregarded.

Moreover, an ink for inkjet recording containing amino acid and the like has been known in the art. However, no attempt has been made to improve a quality of an image printed on a coated paper for commercial printing, by using this ink. For example, Patent Literature 4 discloses an essentially combination of amino acid (including dipeptide) and an amphoteric surfactant as components of an ink and a use of this ink so as to reduce a permeability of the ink into a normal paper and the like for the purpose of improving water-resistance, bleeding, feathering, or the like on a normal paper as a challenge for the dye ink, and also proposes to use amino acid or the like in the ink for the purpose of obtaining excellent optical density.

Patent Literature 5 proposes an ink containing protein or dipeptide, further containing a combination of amino acid and a certain surfactant, for the purpose of improving reliability for preventing clogging of a thermal head. Regarding the reliability for preventing clogging, this literature discloses that the protein or peptide contained in the ink is decomposed due to the structure thereof at the time of using with a thermal head, the decomposed products are deposited on a head heater area resulting in a blockage of a thermal head, and therefore the reliability is significantly lowered. It is further discloses that the above-mentioned lowered reliability for preventing clogging is prevented, and the reliability for preventing clogging is maintained by further adding amino acid and a certain surfactant in combination in the ink.

Patent Literature 6 proposes to add saccharide, reduced saccharide, oxidized saccharide, and the like to an ink for the purpose of improving reliability for preventing clogging, and also discloses that the clogging is prevented by using such the ink as the water evaporation of the ink is inhibited around a nozzle. However, the ink disclosed in this literature is not a pigment ink wherein a moisture content of the ink is reduced and dipeptide is added, so as to realize both of reliability for preventing clogging, and media conveyance and image reliability for preventing beading and cockling, at the time using with commercial media having low absorption of the ink. Here, the term "image reliability" means light fastness, water-resistance and fixing ability of characters or image printed on the media.

Moreover, urea or the like is also listed as a solid moisture retainer in this literature, but comparing to dipeptide, urea has problems such that it tends to slightly increase viscosity of the ink with the same addition amount to that of the peptide, and may increase viscosity of the ink or cause aggregation of a coloring agent due to decomposition thereof ad the time of storage at high temperature.

[Patent literature 1] Japanese Patent Application Laid-Open (JP-A) No. 2005-212327
[Patent literature 2] JP-A No. 11-78225
[Patent literature 3] JP-A No. 2003-25717
[Patent literature 4] JP-A No. 2005-15795
[Patent literature 5] JP-A No. 2006-117634
[Patent literature 6] JP-A No. 2006-122900

DISCLOSURE OF INVENTION

First of all, the present invention aims at providing an ink for inkjet recording, an ink set for inkjet recording, an ink media set for inkjet recording, an ink cartridge, an inkjet recording method, and an inkjet recording apparatus, which produce prints having a high printing quality, excellent density, gloss, and image reliability, like those of commercial printings, but at low cost, and also realize excellent reliability such as high ejecting stability, and high storage stability by selectively utilizing a certain recording medium for inkjet recording, and a certain pigment ink for inkjet recording in combination.

Secondly, the present invention aims at providing an ink for inkjet recording, an ink set for inkjet recording, an ink media set for inkjet recording, an ink cartridge, an inkjet recording method, and an inkjet recording apparatus, which produce prints having a high capability of media conveyance in term of preventing beading of adjacent dots and cockling of a recording medium, excellent density, gloss, and image reliability, like those of commercial printings, but at low cost, and also realize excellent reliability such as stability in terms of preventing nozzle clogging, and high storage stability by selectively utilizing a certain recording medium for inkjet recording, and a certain pigment ink for inkjet recording in combination.

The means for solving the above problems are as follows.
<1> An ink for inkjet recording, comprising:
water;
a water-soluble organic solvent;
a water-dispersible resin;
a fluorochemical surfactant or derivative thereof, and
a coloring agent containing a pigment,
wherein the ink for inkjet recording has a surface tension of 20 mN/m to 35 mN/m at 25° C., and a viscosity of 5 mPa·s or more at 25° C., a total amount of the water-dispersible resin and the coloring agent in the ink for inkjet recording is 5% by mass to 40% by mass, and a mass ratio A/B of the water-dispersible resin A to the coloring agent B is 0.5 to 4,
wherein the ink for inkjet recording is applied for a recording medium for inkjet recording which comprises a support containing a cellulose pulp, and one or more barrier layer disposed on at least one face of the support, and
wherein the barrier layer comprises 30% by mass or more of an inorganic pigment having a refractive index of 1.5 or more, excluding aluminum hydrate, and 10% by mass or less of an inorganic pigment having a refractive index of less than 1.5.
<2> The ink for inkjet recording according to <1>, wherein the water-dispersible resin is at least one selected from the group consisting of an anionic self-emulsified polyurethane ether resin emulsion and an acryl-silicone resin emulsion.

<3> The ink for inkjet recording according to <1> or <2>, wherein the surfactant is a compound expressed by the following structural formula 1:

Structural formula 1

$$R_1 \!\!-\!\!\left[O-CH_2-\underset{\underset{CH_3}{|}}{\overset{\overset{OCH_2-R_2}{|}}{\underset{|}{C}}}-CH_2\right]_p\!\!-\!\!O\!\!-\!\!\left[(C_2H_4O)m(C_3H_6O)n\right]_q\!\!-\!\!\left[CH_2-\underset{\underset{CH_3}{|}}{\overset{\overset{OCH_2-R_4}{|}}{\underset{|}{C}}}-CH_2-O\right]_r\!\!-\!\!R_3$$

in the structural formula 1, each of $R_1$ and $R_3$ denotes either a hydrogen atom or a group containing a fluorine atom, each of $R_2$ and $R_4$ denotes a group containing a fluorine atom, and each of m, n, p, q and r denotes an integer.

<4> An ink for inkjet recording, comprising:
water;
a water-soluble organic solvent;
a water-dispersible resin;
a coloring agent; and
a solid moisture retainer containing a dipeptide,
wherein the ink for inkjet recording has a surface tension of 20 mN/m to 35 mN/m at 25° C., and a viscosity of 5 mPa·s or more at 25° C.,
wherein the ink for inkjet recording is applied for a recording medium for inkjet recording which comprises a support containing a cellulose pulp, and one or more barrier layer disposed on at least one face of the support, and
wherein the barrier layer comprises 30% by mass or more of an inorganic pigment having a refractive index of 1.5 or more, excluding aluminum hydrate, and 10% by mass or more of an inorganic pigment having an refractive index of less than 1.5.

<5> The ink for inkjet recording according to <4>, wherein the dipeptide is at least one selected from the group consisting of alanyl glutamine, glycyl glutamine, bisalanyl cysteine, and bisglycyl cysteine.

<6> The ink for inkjet recording according to any one of <1> to <5>, wherein the water-soluble organic solvent is at least one selected from the group consisting of glycerin, trimethylol propane, ethylene glycol, diethylene glycol, triethylene glycol, propylene glycol, dipropylene glycol, tripropylene glycol, 2-methyl-1,3-propanediol, 1,3-butanediol, 2,3-butanediol, 1,4-butanediol, 2-methyl-1,3-butanediol, 3-methyl-1,3-butanediol, 1,5-pentanediol, 1,6-hexanediol, 2-methyl-2,4-hexanediol, 2-pyrrolidone, N-methyl-2-pyrrolidone, N-hydroxyethyl-2-pyrrolidone, tetramethyl urea, and urea.

<7> An ink set for inkjet recording, comprising:
a black ink; and
a color ink,
wherein each of the black ink and the color ink is the ink for inkjet recording according to any one of <1> to <6>.

<8> An ink media set for inkjet recording, comprising:
the ink for inkjet recording according to any one of <1> to <6>; and
a recording medium for inkjet recording,
wherein the ink contains the coloring agent containing a pigment, contains the water-dispersible resin and the coloring agent at an amount of 5% by mass to 40% by mass in total, and has a mass ratio A/B of the water-dispersible resin A to the coloring agent B is 0.5 to 4,
wherein the recording medium for inkjet recording contains a support containing a cellulose pulp, and one or more barrier layer disposed on at least one face of the support, and
wherein the barrier layer comprises 30% by mass or more of an inorganic pigment having a refractive index of 1.5 or more, excluding aluminum hydrate, and 10% by mass or less of an inorganic pigment having an refractive index of less than 1.5.

<9> The ink media set for inkjet recording according to <8>, wherein the barrier layer has a thickness of 10 μm or less.

<10> The ink media set for inkjet recording according to any one of <8> or <9>, wherein the barrier layer has pores having a diameter of 1 μm or less, and a ratio of an area of the pores occupying in the face of the recording medium for inkjet recording is 40% or less.

<11> An ink cartridge, comprising:
a container; and
the ink for inkjet recording according to any one of <1> to <6>, contained in the container.

<12> An inkjet recording method, comprising:
applying a stimulus to an ink of the ink media set according to any one of <8> to <10> and ejecting the ink so as to record an image on a recording medium of the ink media set according to any one of <8> to <10>.

<13> The inkjet recording method according to <12>, wherein the stimulus is at least one selected from the group consisting of heat, pressure, vibration, and light.

<14> The inkjet recording method according to <12> or <13>,
wherein the ink is ejected so that the image is recorded at an ink deposited amount of 15 g/m² or less.

<15> An inkjet recording apparatus, comprising:
the ink media set for inkjet recording according to any one of <8> to <10>; and
an ink ejecting unit configured to apply a stimulus to the ink, and to eject the ink so as to record an image on the recording medium.

<16> The inkjet recording apparatus according to <15>, wherein the stimulus is at least one selected from the group consisting of heat, pressure, vibration, and light.

<17> The inkjet recording apparatus according to <15> or <16>, wherein the ink ejecting unit ejects the ink on the recording medium so that an ink deposited amount on the recording medium to be 15 g/m² or less.

<18> The inkjet recording apparatus according to any one of <15> to <17>, further comprising a member configured to turn over a side of the recording medium so as to enable a double-side printing.

According to the present invention, firstly, there are provided an ink for inkjet recording, an ink set for inkjet recording, an ink media set for inkjet recording, an ink cartridge, an inkjet recording method, and an inkjet recording apparatus, which produce prints having a high printing quality, excellent density, gloss, and image reliability, similar to those of commercial printings, but at low cost, and also realize excellent reliability such as high ejecting stability, and high storage stability by selectively utilizing a certain recording medium for inkjet recording, and a certain pigment ink for inkjet recording in combination.

According to the present invention, secondly, there are provided an ink for inkjet recording, an ink set for inkjet recording, an ink media set for inkjet recording, an ink cartridge, an inkjet recording method, and an inkjet recording apparatus, which produce prints having a high capability of media conveyance in term of preventing beading of adjacent dots and cockling of a recording medium, excellent density, gloss, and image reliability, similar to those of commercial printings, but at low cost, and also realize excellent reliability such as stability in terms of preventing nozzle clogging, and high storage stability by selectively utilizing a certain recording medium for inkjet recording, and a certain pigment ink for inkjet recording in combination.

Figure 1:
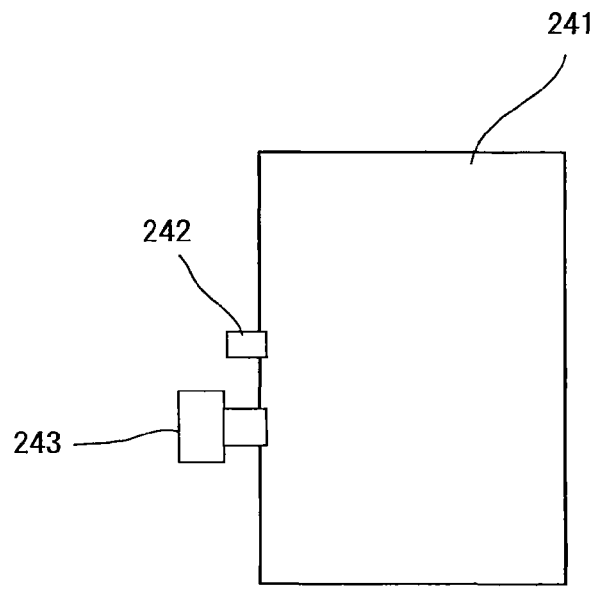
FIG. 1 schematically shows an example of an ink cartridge of the present invention.

BEST MODE FOR CARRYING OUT THE INVENTION (Ink for Inkjet Recording, Ink Media Set for Inkjet Recording, and Ink Set for Inkjet Recording)

The ink for inkjet recording of the present invention is designed for recording on a recording medium for inkjet recording which contains a support containing a cellulose pulp, one or more barrier layer disposed on at least one face of the support, by a inkjet recording system.

A first embodiment of the ink according to the present invention contains water, a water-soluble organic solvent, a water-dispersible resin, a fluorochemical surfactant, and a coloring agent, and optionally contains other substances, if necessary.

A second embodiment of the ink according to the present invention contains water, a water-soluble organic solvent, a coloring agent, and a solid water retainer, and optionally contains other substances, if necessary.

The ink media set for inkjet recording of the present invention contains either the first or second embodiment of the ink, and a recording medium for inkjet recording, which contains a support containing a cellulose pulp, one or more barrier layer disposed on at least one face of the support, wherein the barrier layer contains 30% by mass or more of an inorganic pigment having a refractive index of 1.5 or more, but other than aluminum hydrate, and 10% by mass or less of an inorganic pigment having a refractive index of less than 1.5.

The ink set for inkjet recording of the present invention contains a black ink and a color ink, wherein the black ink and the color ink are each selected from the first and second embodiments of the ink.

Examples of the color ink are a yellow ink, a magenta ink, a cyan ink, and the like. If a recording is performed with two or more inks selected from the black ink, the yellow ink, the magenta ink, and the cyan ink in combination, a multiple color image can be formed. If a recording is performed with inks of all colors in combination, a full color image can be formed.

[Recording Medium for Inkjet Recording]

As an example of the conventional recording medium for inkjet recording, a coated paper for inkjet recording is widely used, and is generally believed to yield a high quality image. The coated paper is designed to absorb or penetrate an ink in an ink accepting layer disposed on a surface of a support, or adjacent to the surface of the support, to thereby form an image. This design is closely related to the fact that a focus of the developments for an ink has mainly been directed to a dye ink in the technology of inkjet recording.

A dye in a liquid is generally penetrated into a material having an affinity to the dye, and is bound to such material by covalent bonding, ionic bonding, Van del Waals face, or the like, to thereby tint the material. On the other hand, a pigment has no or only little self-binding force, and thus the pigment requires an adhesive or binder to bind with another material. In the case where a dye ink in used for inkjet recording, the recording is performed by "dying" the materials in the accepting layer. Since the person in the art needed to consider this dying process, there were the technical problems to be solved, such as how to uniformly dye the accepting layer by using the ink for inkjet printing, and how to improve so as to dye various materials used in the accepting layer with the ink for inkjet recording. To solve such problems and obtain high density and quality images, the technique for absorbing more ink in the accepting layer, the technique for more strongly binding the ink to the materials in the accepting layer, and the technique for attaining both absorbance of ink and coloring quality in a good balance have been developed.

As mentioned earlier, the main stream for the current paper for inkjet recording is the one having an absorbing layer which has high porosity and transparency. To obtain such the layer, it is necessary to use a material which has a low refractive index and a large specific area, and the current situation is such that an expensive material, e.g. silica or alumina hydrate, needs to be used, and highly complicated production method is required. Therefore, the printing cost naturally becomes high, and thus it is difficult to use this technique for mass printing or the like due to its cost.

In view of the above-mentioned problems in the art, the present inventors had diligently studied for realizing an inkjet recording method at lower cost, and they came to invent an inexpensive image forming method by using a certain pigment ink having a high penetration ability, and a recording medium which had a low ink absorbing capacity, which was contrary to the trends in the art, in combination, based on a novel concept of design.

Specifically, printing is performed on a recording medium that is controlled to absorb a pigment as a coloring material contained in the ink as little as possible, by using a little amount of the pigment ink having extremely high penetration ability. In this manner, a solvent contained in the ink is selectively absorbed in the support, the coloring material, i.e. a pigment, in the ink is efficiently remained on the surface of the recording medium, and thus sufficient coloring density and drying speed can be both attained with a little amount of the ink.

The recording medium of the present invention that is controlled with the ink absorbing amount can be attained for example by applying or coating an absorption inhibiting layer for a certain pigment coloring agent, i.e. a barrier layer on a support containing a cellulose pulp as a main component, i.e. a paper support. This barrier layer is configured to resemble its appearance to that of a printing paper, and therefore prints having textures close to conventional commercial printings can also be attained. The desirable penetration, i.e. barrier property, of the barrier layer can be attained by controlling a size and diameter of pores in the barrier layer, a thickness of the barrier layer, and the like.

In order to encourage the separation of the pigment coloring agent from solvent of the ink, the barrier layer preferably has a certain thickness or less. This thickness is preferably 10 μm or less, and is more preferably 5 μm or less. If the thickness of the barrier layer is larger than this range, the time required for penetrating the solvent of the ink is prolonged, and thus the image quality may be decreased due to the occurrence of beading, breading, or the like, and offset or the like tends to be occurred as the drying capability is decreased. Moreover, since it is necessary to make the barrier layer thin, the barrier layer is designed to contain a large amount of an inorganic pigment having a high refraction index and high opacity, contrary to a barrier layer used in a conventional medium for inkjet recording to thereby inhibit blotting of the coloring agent to the bottom side of the medium, namely to inhibit the phenomena that the printed color from the coloring agent is seen from the bottom side of the medium. Therefore, it is required that the barrier layer contains 30% by mass or more of an inorganic pigment having a refractive index of 1.5 or more, preferably 40% by mass or more of the same, and even more preferably from 50% by mass or more up to less than 90% by mass of the same. The barrier layer may optionally contain silica which has low opacity and low refractive index, used for the conventional recording medium for inkjet recording, but the content thereof needs to be 10% by mass or less as the above-mentioned blotting of the ink is increased and a cost is increased when a large amount of a highly transparent pigment is added. To sum up, by using a white pigment having a high refractive index in the barrier layer, a thinned barrier layer can be attained while reducing the blotting of the ink and the cost.

Moreover, some of aluminum hydrate is generally listed as a pigment having a high refractive index. If such pigment as aluminum hydrate which has a high oil absorbing capacity is added at a large amount in the barrier layer, a solvent of the ink is not easily transferred to the support from the barrier layer. The aluminum hydrate absorbing a large amount of the solvent causes smear in an image due to discoloration or migration of the pigment during a long-term storage, and thus it is not acceptable in the present invention.

The functions required for the barrier layer are to separate the pigment from the solvent in the ink, and to allow only the solvent to penetrate into the support. To this end, it is preferable that the barrier layer has fine cavities, i.e. pores, therein. In the case where no pore is present in the barrier layer, the penetration of the solvent in the ink is delayed, or the ink is hard to dry. However, if the diameter of the pores is excessively large or excessively large numbers of the pores are present in the barrier layer, the function to separate the pigment from the solvent of the ink is lowered, and thus an image density may be decreased, or the pigment present on the surface of the recording medium after printing starts migrating into the recording medium with age, resulting in a change in the color. Therefore, a diameter of the pores is preferably 1 μm or less, and an area of pores occupying in the surface of the recording medium is preferably 40% or less.

The measurements for the diameter of the pores and the area of the pores occupying in the surface of the recording medium can be carried out by observing the surface of the recording medium on a photography taken by means of Scanning Electron Microscopy (SEM). Based on the surface picture, an image of the area of the pores is translated into 2 digits, and a diameter and area ratio thereof can be obtained. In the present invention, a field emission scanning electron microscope HSM-7400F manufactured by JEOL Ltd. is used as a SEM instrument, and Pop Imaging Ver. 3.51 manufactured by Digital Being Kids Limited is used for image processing.

Examples of the inorganic pigment for use in the present invention are: magnesium carbonate, talc, kaolin, illite, clay, calcium carbonate, calcium sulfite, titanium white, magnesium carbonate, titanium dioxide, and the like. By selecting and using the pigment having higher refraction index from these pigments, a thickness of the barrier layer can be thinned. In view of the cost, however, calcium carbonate and kaolin are preferable therefrom. These pigments can be used in combination provided that they do not adversely affect the effects of the present invention. Moreover, these pigments may also be used in combination with other pigments than the ones listed above. Kaolin is preferably used, because kaolin gives excellent gloss, and realizes a recording medium having a texture close to that of a medium for offset printing. Kaolin includes delaminated kaolin, fused kaolin, engineered kaolin which is surface processed, and the like. In view of glossiness, kaolin preferably has 50% by mass or more of kaolin particles which have a particle size distribution of such that 80% by mass or more of particles having the diameter of 2 μm or less, with respect to the total amount of kaolin particles. The content of kaolin is preferably 50 parts by mass or more. If the content is less than 50 parts by mass, an effect in glossiness cannot sufficiently be exhibited. There is no upper limit for the added amount of kaolin, but it is preferably less than 90 parts by mass in view of coating applicability under consideration of fluidity of kaolin, especially that increased viscosity at high shearing force.

Moreover, such pigment having high refractive index can be used together with silica that has low refractive index or an organic pigment. Examples of the organic pigment include aqueous dispersion of particles such as styrene-acryl copolymer particles, styrene-butadiene copolymer particles, polystyrene particles, polyethylene particles, or the like. Two or more of these organic pigments may used in combination. Since the organic pigment gives excellent gloss and its relative mass is smaller compared to an inorganic pigment, a coating layer of desirable bulkiness, high gloss, and excellent coating ability can be attained. However, if the content of the organic pigment is less than 2 parts by mass, the above-mentioned effects cannot be attained. On the other hand, if the content is more than 5 parts by mass, ink setoff may occur and also it is not effective in terms of cost. The organic pigment has configurations such as solid, hollow, doughnut shaped, and the like. Considering the balance between gloss exhibition, surface coating ability, and fluidity of a coating liquid, it is preferable that the organic pigment has an average particle diameter of 0.2 μm to 3.0 μm, and it is more preferably that hollow organic pigment having void ratio of 40% or more is used.

A binder of the barrier layer for use in the present invention is selected without any particular restriction, provided that it is a water-soluble resin, emulsion, and the like, which do not cause blocking. Examples of the water-soluble resin include polyvinyl alcohol, a starch such as an oxidized starch, an esterified starch, an enzyme modified starch, a cationatid starch, or the like, a cellulose derivative such as casein, soy protein, carboxymethyl cellulose, hydroxyethyl cellulose, or the like, styrene-acryl copolymer, isobutylene-maleic anhydride, acrylic emulsion, polyvinyl acetate emulsion, vinylidene chloride emulsion, polyester emulsion, styrene-butadiene copolymer latex, acrylnitrile-butadiene copolymer latex, and the like. Among these, the starch and the styrene-butadiene copolymer latex are preferable for use in view of the cost.

The styrene-butadiene copolymer latex is copolymer latex generally used for coating a paper, which contains styrene and butadiene as monomers, optionally contains other monomers to copolymerize, and optionally is a copolymer modified by a chemical reaction. Examples of the other monomers include acrylic acid, methacrylic acid alkyl ester of acrylic acid or methacylic acid, acrylnitrile, maleic acid, fumaric acid, vinyl monomer such as vinyl acetate, and the like. In addition, the styrene-butadiene copolymer latex optionally contains a crosslinking agent such as methylol melamine, methylol urea, methylol hydroxypropylene urea, isocyanate, or the like, or contains self-crosslinkable copolymer containing a unit such as N-methylolacrylamide. One of them may be used, or two or more of them may be used in combination in the styrene-butadiene copolymer latex.

A solids content of the water-soluble binder is preferably 50% by mass to 70% by mass, more preferably 55% by mass to 60% by mass with respect to the total solids of the barrier layer.

In the case where the solids content is small, the binding ability becomes insufficient, to thereby lower the strength of the ink accepting layer and the binding strength between the components within the layer to cause flaking.

Other components can be added to the barrier layer, if necessary, provided that such components do not adversely affect the objects and effects of the present invention. Examples of such components include various agents usually mixed with a pigment for coating, such as a surfactant, a dispersing agent, a thickener, a moisture retainer, an antifoaming agent, a waterproof agent, or the like, and additives such as a pH controlling agent, a preservative, an anti-oxidizing agent, a cationic organic compound, or the like.

The surfactant for use in the barrier layer can be selected from an anionic surfactant, a cationic surfactant, an amphoteric surfactant, and a nonionic surfactant depending on the purpose without any restriction. Among the listed surfactants above, the nonionic surfactant is particularly preferable.

Examples of the nonionic surfactant include a high alcohol ethylene oxide adduct, an alkylphenol ethylene oxide adduct, a fatty acid ethylene oxide adduct, a polyhydric alcohol fatty acid ester ethylene oxide adduct, a higher aliphatic amine ethylene oxide adduct, a fatty acid amide ethylene oxide adduct, an ethylene oxide adduct of oils and fats, a polypropylene glycol ethylene oxide adduct, fatty acid ester of glycerol, fatty acid ester of pentaerythritol, fatty acid ester of sorbitol and sorbitan, fatty acid ester of sucrose, alkyl ether of polyhydric alcohol, fatty acid amide of alkanol amide, and the like. As the nonionic surfactant, one of them may be used, or two or more of them may be used in combination.

The polyhydric alcohol is appropriately selected without any restriction. Suitable examples thereof are glycerol, trimethylol propane, penterythrite, sorbitol, sucrose, and the like. Suitable examples of the ethylene oxide adduct include ethylene having a part of which is substituted with alkylene oxide such as propylene oxide or butylene oxide, provided that a water-solubility thereof is maintained. The substitution rate is preferably 50% or less. Hydrophilic-lipophilic balance (HLB) of the nonionic surfactant is preferably 4 to 15, more preferably 7 to 13.

It is not necessary to add the cationic organic compound, but the cationic organic compound can be appropriately added depending on the purpose without any restriction.

Examples of the cationic organic compound include a condensation product of dimethyl amine and epichlorohydrin, a condensation product of dimethyl amine, ammonium, and epichlorohydrin, poly(jethacrylic acid triethylaminoethyl-methylsulphate), a copolymer of polyacrylic amine and diacryl amine, a copolymer of polyvinyl amine, dicyane diamide, a condensation product of dicyane diamide, ammonium chloride, urea, and formaldehyde, a condensation product of polyalkylene polyamine and ammonium dicyane diamide, dim ethyldiarylammonium chloride, polydiarylmethylamine hydrochloride, poly(diaryldimethylammonium-chloride), poly(diaryldimethylammoniumchloride-sulfur dioxide), poly(diaryldimethylammoniumchloride-diarylamine hydrochloride derivative), a copolymer of acrylamine and diaryldimethylammoniumchloride, a copolymer of acrylate, acrylamide, and diarylamine hydrochloride, polyethyleneimine, ethylene imine derivative such as acrylamine polymer or the like, a modified product of polyethyleneimine alkylene oxide, and the like. One of them may be used, or two or more of them may be used in combination as the cationic organic compound.

-Support-

The support for use in the present invention is one produced by mixing chemical pulps, mechanical pulps, recycled pulps and the like at a predetermined ratio, optionally adding therein an internally adding sizing agent, a retention aid, a paper strength additive, and the like, and making paper from the mixture by means of a fourdrinier former, a gap-type twin-wire formed, or a hybrid former that is a fordrinier having its latter part modified with twin-wire.

The pulps used for the support contains: virgin chemical pulp (CP) which is obtained by chemically treating wood and its fibrous material, such as a bleached hardwood kraft pulp, a bleached softwood kraft pulp, an unbleached hard wood kraft pulp, an unbleached soft wood kraft pulp, a bleached hard wood sulfite pulp, a bleached softwood sulfite pulp, an unbleached hardwood sulfite pulp, an unbleached softwood sulfite pulp, and the like; and virgin mechanical pulp (MP) which is obtained by mechanically treating wood and its fibrous material, such as a ground pulp, a chemi-ground pulp, a chemi-mechanical pulp, a semi-chemical pulp, and the like.

The recycle pulp can also be used in the support, and raw materials of the recycle pulp are, for example, papers defined as terms of "high white", "line white", "cream white", "card", "special white", "mild white", "imitation", "color high", "Kent", "white art", "special high cut", "separate high cut", "news paper", "magazine", and the like in Standard Chart of Recycled Paper, produced by Paper Recycling Promotion Center that is Japanese non-profit foundation (the above-mentioned definitions can be found in the chart). Specific examples include: printing papers such as a non-coated paper for personal computers, that is paper for information technology or the like, a thermosensitive paper, a pressure sensitive paper, and the like; a recycled OA paper such as paper for PPC; an art paper, a coated paper, a slightly coated paper, a matt paper, and the like; recycle papers or cardboards of high quality papers, of high quality color papers, of a paper from note books, of a paper from letter pads, of lapping papers, of fancy papers, of middle quality papers, of news paper, of bank papers, of lapping papers used in supermarkets, of imitation papers, of pure-white rolling papers, of non-coated papers such as milk cartons, and the like, and those examples listed above are papers containing chemical pulps, papers containing high yield pulps, and the like. One of these may be used or two or more of them may be used in combination as the recycled pulp.

The recycled pulp is generally produced by the combination of the following four steps.
(1) Breaking out of a recycled paper is carrier out by treating the paper with mechanical force or chemical by means of a pulper so as to break down to fibers, and detaching the printing ink from the fibers.
(2) Removal of dusts is carried out by removing foreign substances and dusts obtained in the recycled paper by a screen or a cleaner.
(3) Removal of an ink is carrier out by removing the detached ink from the fibers using a surfactant in accordance with a flotation method or washing method, to thereby remove from the system.
(4) Bleaching is carrier out by using an oxidation reaction or a reduction reaction to thereby increase whiteness of the fibers.

In the case where the recycled pulp is added to the pulp used for the support, the mixing amount of the recycled pulp is preferably 40% or less based on the total amount of the pulp for the purpose of preventing curling of the support after recording.

As an additive used in the support, calcium carbonate is effective, but calcium carbonate can be used in combination with inorganic additives such as kaolin, calcined clay, pyrophyllite, sericite, silicic acids such as talc, and the like, satin white, barium sulfate, calcium sulfate, zinc sulfate, and organic pigments such as a plastic pigment, a urea resin, and the like.

The internally adding sizing agent for use in the support is suitably selected from conventional internally adding sizing agents used for inkjet recording mediums, without any particular restrictions. Suitable internally adding sizing agents are, for example, a rosin emulsion sizing agent, and the like. The internally adding sizing agent used at the time when a sheet of the support is made is, for example, neutral rosin sizing agent used for making neutral paper, alkenyl succinic anhydride (ASA), alkyl ketene dimer (AKD), petroleum resin sizing agent, or the like. Among these, the neutral rosin sizing agent or alkenyl succinic anhydride is particularly suitable. In the case where alkyl ketene dimer is used, the addition amount thereof can be small since alkyl ketene dimer has a high sizing effect. However, alkyl ketene dimer reduces friction coefficient of a surface of the recording medium, and thus the surface of the recording medium becomes easy to slip. Therefore, use of alkyl ketene dimer is not preferable in term of transfer performance of the recording medium at the time of inkjet recording. The addition amount of the internally adding sizing agent is 0.1 parts by mass to 0.7 parts by mass with respect to 100 parts by mass of bone-dry pulp, but it may be adjusted depending on the purpose.

The internal additives for use in the support are, for example, conventional pigments as a white pigment. Examples of the white pigment include: inorganic white pigments such as precipitated calcium carbonate, heavy calcium carbonate (limestone powder), kaolin, clay, talc, calcium sulfate, barium sulfate, titanium dioxide, zinc oxide, zinc sulfide, zinc carbonate, satin white, aluminum silicate, silious earth, calcium silicate, magnesium silicate, synthetic silica, aluminum hydroxide, alumina, lithopone, zeolite, magnesium carbonate, magnesium hydroxide, and the like; organic pigments such as styrene plastic pigment, acrylic plastic pigment, polyethylene, microcapsule, urea resin, melamine resin, and the like. One of these may be used, or two or more of these may be used in combination as the internal additive.

-Method for Forming a Barrier Layer-

A method for forming a barrier layer on the support is not restricted, but can be selected from a method for directly coating, a method for coating on a temporally substrate, and then transferring to the support, and a method for atomizing using a spray or the like. Examples of the method for directly coating include a roll-coater method, an air-knife coater method, a gate-roll coater method, a size-press method, a shim-sizer method, a film transfer system such as rod-metaling size press coater, a blade coater system by fountain or roll application, and the like.

A drying treatment of the barrier layer can be performed, for example, by using a hot drying hearth or a heat drum. Moreover, the barrier layer may further be subjected to a surface treatment by using a calender device, i.e. super calender, soft calender, gloss calender, or the like, for the purpose of smoothing the surface, or increasing the strength of the surface.

As mentioned earlier, the barrier layer for use in the present invention can be disposed by coating. After the present inventors had conducted numbers of studies, it was found that functions of a barrier layer could be attained by polishing a surface of a conventional coated paper for printing. This is probably because a thickness of a coat layer of the conventional coated paper is reduced to a thickness of the barrier layer suitable for the present invention by polishing, and functions as a barrier layer are exhibited as a result of removing a resin layer present on the outermost surface of the coating by polishing and exposing pores presented inside to the surface.

Specific examples of the conventional coated paper include: coated paper used for commercial printing, i.e. offset printing, gravure printing, and the like, such as art paper (A0 size, A1 size), A2 size coated paper, A3 size coated paper, B2 size coated paper, lightweight coated paper, finely coated paper, and the like.

Specific examples for commercial products of the art paper are: Golden Cask Gloss N, Golden Cask Gloss-R40N, Golden Cask Super Art N, Golden Cask Satin N, Golden Cask Satin-R40N, Golden Cask Ultra Satin N, Ultra Golden Cask Gloss N, and ½ Side Golden Cask Gloss manufactured by Oji Paper Co., Ltd.; NPi Special Art, NPi Super Art, NPi Super Dull, and NPi Dull Art manufactured by Nippon Paper Group, Inc.; Utrillo Super Art, Utrillo Super Dull, and Utrillo Premium manufactured by Daio Paper Corporation; High-quality Art A, Special Mitsubishi Art, Super Mat Art A, and High-quality Dull Art A manufactured by Mitsubishi Paper Mills Limited; Snow Grouse Super Art A, Snow Grouse Super Art MN, Snow Grouse Special Art, and Snow Grouse Dull Art N manufactured by Chuetsu Pulp & Paper Co., Ltd.; and the like.

Specific examples for commercial products of the A2 size coated paper are: OK Top Coat + (Plus), OK Top Coat S, OK Casablanca, OK Casablanca V, OK Trinity, OK Trinity NaVi, New Age, New Age W, OK Topcoat Matt N, OK Royal Coat, OK Topcoat Dull, Z coat, OK Kasahime, OK Ksao, OK Ksao Satin, OK Topcoat+, OK Non-wrinkle, OK Coat V, OK Coat N Green 100, OK Mat Coat Green 100, New Age Green 100, and Z Coat Green 100 manufactured by Oji Paper Co., Ltd.; Aurora Coat, Sea Roar Mat, Imperial Mat, Silver Diamond, Recycle Coat 100, and Recycle Mat 100 manufactured by Nippon Paper Group, Inc.; Mu Coat, Mu Coat White, Mu Mat, and White Mue Mat manufactured by Hokuetu Paper Mills, Ltd.; Snow Grouse Coat N, Regina Snow Grouse Coat 100, Snow Grouse Mat Coat N, and Regina Snow Grouse Mat 100 manufactured by Chuetsu Pulp & Paper Co., Ltd.; Peal Coat, White Peal Coat N, New V Mat, White New V Mat, Peal Coat REW, White Peal Coat NREW, New V Mat REW, and White New V Mat REW manufactured by Mitsubishi Paper Mills Limited; and the like.

Specific examples for commercial products of the A3 size coating (lightweight coating) paper are: OK Coat L, OK Royal Coat L, OK Coat LR, OK White L, OK Royal Coat LR, OK Coat L Green 100, and OK Mat Coat L Green 100 manufactured by Oji Paper Co., Ltd.; Easter DX, Recycle Coat L100, Aurora L, Recycle Mat L100, and <SSS> Energy White manufactured by Nippon Paper Group, Inc.; Utrillo Coat L, and Matisse Coat manufactured by Daio Paper Corporation; Hi-Alpha, Alpha Mat, (N) Kinmari L, and Kinmari HiL manufactured by Hokuetu Paper Mills, Ltd.; N Peal Coat L, N Peal Coat LREW, and Swing Mat REW manufactured by Mitsubishi Paper Mills Limited; Super Emine, Emine, and Shaton manufactured by Chuetsu Pulp & Paper Co., Ltd.; and the like.

Specific examples for commercial products of the B2 size coating (middleweight coating) paper are: OK Middleweight Coat, (F) MCOP, OK Astro Gloss, OK Astro Dull, and OK Astro Mat manufactured by Oji Paper Co., Ltd.; King 0 manufactured by Nippon Paper Group, Inc.; and the like.

Specific examples for commercial products of the finely coated paper are: OK Royal Light S Green 100, OK Ever Light Coat, OK Ever Light R, OK Ever Green, Clean Hit MG, OK Fine Coating Super Eco G, Eco Green Dull, OK Fine Coating Mat Eco G100, OK Star Light Coat, OK Soft Royal, OK Bright, Clean Hit G, Yamayuri Bright, Yamariyu Bright G, OK Aqua Light Coat, OK Royal Light S Green 100, OK Bright (Rough/Gloss), Snow Mat, Snow Mat DX, OK Kasahime, and OK Kasayuri manufactured by Oji Paper Co., Ltd.; Pirene DX, Pegasus Hyper 8, Aurora S, Andes DX, Super Andes DX, Space DX, Seine DX, Special Gravure DX, Pegasus, Silver Pegasus, Pegasus Harmony, Green Land DX100, Super Green Land DX100, <SSS> Energy Soft, <SSS> Energy Light, and EE Henry manufactured by Nippon Paper Group, Inc.; Kant Excel, Excel Super B, Excel Super C, Kant Excel Bal, Utrillo Excel, Heine Excel, and Dante Excel manufactured by Daio Paper Corporation; Cosmo Ace manufactured by Nippon Daishowa Paperboard Co., Ltd.; Semi-Upper L, High-Beta, High-Gamma, Shiromari L, Hamming, White Hamming, Semi-Upper HiL, and Shiromari HiL manufactured by Hokuetu Paper Mills, Ltd.; Ruby Light HREW, Peal Soft, and Ruby Light H manufactured by Mitsubishi Paper Mills Limited; Shaton, Ariso, and Smash manufactured by Chuetsu Pulp & Paper Co., Ltd.; Star Chemy, and Chemy Super manufactured by Marusumi Paper Co., Ltd.; and the like.

The conventional formula for a coating layer of the commercial recording paper generally shown in various documents is, for example, mixing 10 parts to 15 parts by a binder, e.g. a resin, emulsion, starch, and the like, with 100 parts of an inorganic pigment, e.g. kaolin, calcium carbonate, and the like. Analyzing the condition of the pigment present in the coating layer, specifically the density deviation of the pigment within the coating layer, the following possible questions can be considered: (1) a clear layer formed on the outermost layer of the coated film, when a coating liquid is used, and (2) the binder component is penetrated into a base paper, and thus a density distribution is dissymmetrical between the upper layer and the bottom layer. Regarding the problem (1), the present inventors studied the publications of this field (publication related to glossiness or the like of a coated paper). However, it seemed that this problem had not been actively discussed in the art. It is assumed that the coating liquid of the coating layer contains a low mixing rate of the resin compared to general coating liquid, the enough amount of the resin is not contained to precipitate in the surface, and thus a clear layer or the like is not easily formed.

In the occasion of the discussion with other engineers in the field of commercial coated paper, there were people who believed that the binder for use in the commercial coated paper needed to be added at a minimum amount, since some believed that the functions of the binder were to prevent pealing of a layer at the time of printing, and to maintain just enough strength to prevent flaking off of the powder at the time of cutting the paper, and a coating process was likely to be affected if the addition amount of the resin was increased.

With regard to the problem (2), though phenomena such that a ratio of the resin in the actual coating layer becomes lower than the rat of the resin in the coating liquid in the process of penetrating the resin of the coating liquid into the base paper, and a layer is formed between the coating layer and the base layer, no case has been recognized (even in publications) regarding the generation of deviation within the layer itself. However, there is a case that a resin-rich layer is formed at interfere between the coating layer and the base paper. In this case, it is assumed that the bottom layer has higher density of the resin.

A method for polishing an outermost surface of the coating layer is, for example, a method which uses a sand paper or wrapping paper for polishing, a method which uses a wire-brush for polishing, a method which uses a polishing roller, or polishing endless belt for polishing, a method which uses sand blast for polishing, or the like. However, examples of the polishing method are not limited to those listed above.

The polishing treatment can be performed just before drying, or either before or after conducting a calendering treatment in the process of producing a coat paper. Alternatively, the polishing treatment may be curried out by appropriately arranging a polishing process after a coating process, for example, after a slitting process, or after a wrapping process. Moreover, the polishing treatment can be performed by users by using a polishing device before conducting printing. It is also possible to integrate the polishing device into a printer, and to perform the polishing treatment every time printing is conducted.

For the polishing treatment, an entire surface of a recording medium may be polished, or only an area where an inkjet recording is performed may be selectively polished.

For example, off-set printing or gravure printing is previously performed on the general recording medium exemplified above, the recording medium is then subjected to the polishing treatment at where inkjet recording is performed, and inkjet recording is actually conducted on a part of the recording medium where previously polished.

According to this method, a hybrid printing, which have conventionally been performed by using both an inkjet recording medium and a general recording medium, can be performed by using only a general recording medium, and a unification of a recording medium can be realized between general printing and inkjet printing. In addition, printing of address, which is difficult to be done by general printing, can be performed by inkjet printing.

The polishing device may be integrated into a unit of a printer, or be independently prepared as a separate unit.

Moreover, a recording medium of the present invention can be replaced with a special coated paper, provided that the coated paper satisfies the requirements defined in the present invention. Especially, a coated paper which has high air permeability of a coating layer itself can be used in the present invention. Examples of such coated paper having high air permeability are: some coated paper for electrophotography, coated paper for gravure printing, and the like. Specific examples thereof include POD Gloss Coat manufactured by Oji Paper Co., Ltd., FL Gravure manufacture by Nippon Paper Group, Inc., Ace manufactured by Nippon Paper Group, Inc., and the like. The coating layer of these coated papers has large number of pores, and thus these coated papers can be used as a replacement of the recording medium having the barrier layer of the present invention.

[Ink for Inkjet Recording]

The ink for inkjet recording has extremely high permeability, and a surface tension of 20 mN/m to 35 mN/m at 25° C., preferably 23 mN/m to 33 mN/n at 25° C. If the surface tension of the ink is less than 20 mN/n, the ink attached to the surface of the nozzle head cannot be completely removed after head-wiping operation, and thus it may adversely affect the reliability of the head after leaving for a long period. If the surface tension of the ink is more than 35 mN/m, the permeability of the ink to a recording medium may be degraded. As a result of this, dots formed from the ink droplet may not have sufficient wet-speadability, and the effects for reducing the occurrence of beading may be reduced.

Moreover, the ink for inkjet recording has a viscosity of 5 mPa·s or more, and preferably ranging from 5 mPa·s to 20 mPa·s at 25° C. If the viscosity is less than 5 mPa·s, it may adversely affect to the medium, in terms of occurrence of beading, or transfer ability such as the occurrence of cockling. If the viscosity is more than 20 mPa·s, the viscosity is largely increased at the low temperature, such as 10° C., and it may adversely affect ejection reliability of the head, reliability for nozzle clogging.

-Coloring Agent-

The coloring agent for use in the ink of the present invention is, for example, a hydrophobic dye, a pigment, or the like. The hydrophobic dye is a dye which has insolubility or poor solubility to water, but is soluble to an organic solvent. Examples of the hydrophobic dye include oil-soluble dyes, dispersible dyes, and the like. These hydrophobic dyes can be used as a polymer emulsion wherein the hydrophobic dye is contained in the polymer. Considering its adsorption and/or easiness of encapsulation, the oil-soluble dye and the dispersible dye are preferably used, but the pigment is particularly preferable in terms of the light fastness of the obtained image.

The above-mentioned expression "the hydrophobic dye is contained in the polymer" means both the conditions of the hydrophobic dye being encapsulated in polymer fine particles, and the hydrophobic dye being attached to the surface of the polymer fine particles. Here, not all of the coloring agent contained in the ink need to be encapsulated in or attached to the polymer fine particles. The coloring agent can be dispersed in the emulsion, provided that it does not adversely affect the effects of the present invention. The coloring agent can be selected without any restriction, as long as it has insolubility or poor solubility to water, and is absorbed with a polymer. In the present specification, the term "insolubility to water" or "poor solubility to water" defines the condition such that 100 parts by mass of 20° C. water dissolves no more than 0.1 parts by mass of the coloring agent. Here, the term "dissolve" means that the separation or precipitation of the coloring agent is not observed with naked eyes in the surface or bottom part of the solution.

Examples of the pigment include a black pigment, and a color pigment. Examples of the black pigment include carbon black and the like. Examples of the color pigment include anthraquinone, phthalocyanine blue, phthalocyanine green, diazo, monoazo, pyranthrone, perylene, heterocyclic yellow, quinacridone, (thio)indigo, and the like. Examples of phthalocyanine blue include cupper phthalocyanine blue and a derivative thereof (including C.I. Pigment Blue 14). Examples of quinacridone include: C.I Pigment Orange 48 and 49; C.I. Pigment Red 122, 192, 202, 206, 207, and 209; and C.I. Pigment Violet 19 and 42. Examples of anthroquinone include Pigment Red 43, 194 (perynone red), 216 (pyranthrone bromide red), and 226 (pyranthrone red). Examples of perylene include: C.I. Pigment Red 123 (vermilion), 149 (scarlet), 179 (marron), and 190 (red); C.I. Pigment Violet; C.I. Pigment Red 189 (yellow shaded red), and 224. Examples of thioindigo include: C.I. Pigment Red 86, 87, 88, 181, and 198; C.I. Pigment Violet 36 and 38. Examples of heterocyclic yellow include C.I. Pigment Yellow 117 and 138. Other suitable examples of the pigment were listed in "The Color Index, The Society of Dyers and Colorists, 1982".

The pigment for use in the ink of the present invention may be a pigment having directly or, via another group of atoms, at least one hydrophilic group on the surface thereof. Such the pigment can be stably dispersed without the assistance of a dispersant. The pigment wherein a hydrophilic group is introduced onto the surface thereof is preferably an ionic pigment, more preferably the one anionicly or cationicly charged.

Examples of the anionic hydrophilic group include the groups expressed as follows: —COOM, —$SO_3$M, —$PO_3$HM, —$PO_3M_2$, —$SO_2NH_2$, and —$SO_2$NHCOR (note that M denotes one selected from the group consisting of a hydrogen atom, alkali metal, ammonium, and organic ammonium, and R denotes one selected from a C1-12 alkyl group, a substituted or unsubstituted phenyl group, and a substituted or unsubstituted naphthyl group). Among them, the pigment having —COOM, or —$SO_3$M bonded onto the surface thereof is preferable. The method for obtaining the anioicly charged pigment is, for example, a method wherein a pigment is subjected to an oxidation treatment using sodium hypochlorite, a method wherein a pigment is subjected to a sulfonation treatment, a method wherein the pigment is reacted with a diazonium salt, or the like, but not limited thereto.

A hydrophilic group bonded to a cationicly charged color pigment is, for example, a quaternary ammonium group, or the like.

As the pigment for use in the ink of the present invention, a dispersion having a pigment dispersed in an aqueous medium with assistance of a dispersant. The dispersant is preferably one selected from the conventional dispersants used for controlling pigment dispersion.

Specific examples of the dispersant include polyacrylic acid, polymethacrylic acid, acrylic acid-acrylonitrile copolymer, vinyl acetate-acrylic ester copolymer, acrylic acid-alkyl acrylate copolymer, styrene-acrylic acid copolymer, styrene-methacrylic acid copolymer, styrene-acrylic acid-alkyl acrylate copolymer, styrene-methacrylic acid-alkyl acrylate copolymer, styrene-α-methylstyrene-acrylic acid copolymer, styrene-α-methylstyrene-acrylic acid-alkyl acrylate copolymer, styrene-maleic acid copolymer, vinyl naphthalene-maleic acid copolymer, vinyl acetate-ethylene copolymer, vinyl acetate-fatty acid vinyl ethylene copolymer, vinyl acetate-maleic ester copolymer, vinyl acetate-crotonic acid copolymer, vinyl acetate-acrylic acid copolymer, and the like.

The nonionic or anionic activating dispersant for dispersing the pigment can be appropriately selected depending on the pigment for use or components of the ink. Examples of the nonionic surfactant as the dispersant include: polyoxyethylenealkylether such as polyoxyethylenelaurylether, polyoxyethylenemryistylether, polyoxyethylenecetylether, polyoxyethylenestrearylether, polyoxyethyleneoleylether, or the like; polyoxyethylenealkylphenylether such as polyoxyethyleneoctylphenylether, polyoxyethylenenonylphenylether, or the like; polyoxyethylene-α-naphthylether expressed by the following general formula 1; polyoxyethylenemnostrearylphenylether; polyoxyethylenedistylylphenylether; polyoxyethylenealkylnaphthylether; polyoxyethylenemonostyrylnaphthylether; polyoxyethylenedistyrylmaphthylether; polyoxyethylene-polyoxypropylene block polymer; and the like. Also examples include a surfactant which is at least one selected from the one listed above wherein a part of polyoxyethylene is substituted with polyoxypropylene, a surfactant which is a compound having an aromatic ring, e.g. polyoxyethylene-alkylphenylether, is condensed with formaldehyde General formula 1

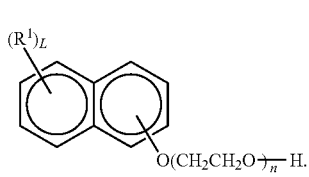

In the general formula 1, $R^1$ denotes a C1-20 alkyl group, aryl group, or aralkyl group. L denotes 0 or an integer ranging from 1-7. n denotes an integer ranging from 20-200, preferably 20-100, more preferably 30-50.

Examples of the C1-20 alkyl group for $R^L$ include methyl group, ethyl group, n-propyl group, i-propyl group, n-butyl group, i-butyl group, t-butyl group, n-pentyl group, i-pentyl group, cyclopentyl group, n-hexyl group, i-hexyl group, cyclohexyl group, n-heptyl group, i-heptyl group, n-octyl group, i-octyl group, n-nonyl group, i-nonyl group, n-decyl group, i-decyl group, n-undecyl group, i-undecyl group, n-dodecyl group, i-dodecyl group, cyclopropyl group, cyclobutyl group, cyclopentyl group, cycloheptyl group, cyclooctyl group, and the like.

Examples of the aralkyl group for $R^L$ include benzyl group, phenethyl group, 2-methylbenzyl group, 3-methylbenzyl group, 4-methylbenzyl group, and the like.

The HLB value of the nonionic surfactant is preferably the range of 12 or more but 19.5 or less, more preferably the range of 13 or more but 19 or less. If the nonionic surfactant has HLB value of less than 12, the surfactant does not have good compatibility to the dispersion medium, and thus dispersion stability is lowered. If the nonionic surfactant has HLB value of more than 19.5, the surfactant does not have good compatibility to the pigment, and thus dispersion stability is lowered.

Examples of the anionic surfactant include polyoxyethylenealkylether sulfate, polyoxyethylenealkylphenylether sulphate, polyoxyethylenemonostyrylphenylether sulphate, polyoxyethylenedistyrylphenylether suphate, polyoxyethylenealkylether phosphate, polyoxyethylenealkylphenylether phosphate, polyoxyethylenemonostyrylphenylether phosphate, polyoxyethylenedistyrylphenylether phosphate, polyoxyethylenealkylether carbonate, polyoxyethylenealkylphenylether carbonate, polyoxyethylenemonostyrylphenylether carbonate, polyoxyethylenedistyrylphenylether carbonate, naphthalene sulfonate formaldehyde condensation product, melanin sulfonate-formaldehyde condensation product, dialkylsulfosuccinate, alkyl disulfosuccinate, polyoxyethylenealkyl disulfosuccinate, alkylsulfoacetate, α-olephine sulfonate, alkylbenzenesulfonate, alkylnaphthalene sulfonate, alkyl sulfonate, N-acyl amino acid salt, acyl peptide, soap, and the like. Among these, sulfate or phosphate of polyoxyethylenealkylether, polyoxyethylenealkylphenylether, and polyoxyethylenedistyrylphenylether are particularly preferable.

The content of the surfactant as the dispersant is preferably 10% by mass to 50% by mass relative to the amount of the pigment. If the content of the dispersant is less than 10% by mass, storage stability of the dispersed pigment and ink is lowered, or extremely long time is required for dispersing the pigment. If the content of the dispersant is more than 50% by mass, the viscosity of the ink becomes excessively high, and thus ejection stability becomes lowered.

Moreover, a resin-coated coloring agent is also used as the coloring agent. The resin-coated coloring agent is precisely explained hereinafter.

The resin-coated coloring agent is formed of polymer emulsion including polymer fine particles which contain the coloring agent having insolubility or poor solubility to water. The expression "polymer fine particles which contain the coloring agent" means both the conditions of the coloring agent being encapsulated in polymer fine particles, and the coloring agent being attached to the surface of the polymer fine particles. Here, not all of the coloring agent contained in the ink need to be encapsulated in or attached to the polymer fine particles. The coloring agent can be dispersed in the emulsion, provided that it does not adversely affect the effects of the present invention. The coloring agent can be selected without any restriction, as long as it has insolubility or poor solubility to water, and is absorbed with a polymer. In the present specification, the term "insolubility to water" or "poor solubility to water" defines the condition such that 100 parts by mass of 20° C. water dissolves no more than 0.1 parts by mass of the coloring agent. Here, the term "dissolve" means that the separation or precipitation of the coloring agent is not observed with naked eyes in the surface or bottom part of the solution.

Examples of the coloring agent include a hydrophobic dye such as an oil-soluble dye, dispersible dye or the like, the pigment, and the like. Considering its adsorption and/or easiness of encapsulation, the oil-soluble dye and the dispersible dye are preferably used, but the pigment is particularly preferable in terms of the light fastness of the obtained image.

Examples of the hydrophobic dye are listed below.

Examples of the oil-soluble dye include each product number of C.I. Solvent Black, C.I. Solvent Yellow, C.I. Solvent Red, C.I. Solvent Violet, C.I. Solvent Blue, C.I. Solvent Green, and C.I. Solvent Orange. These are available from Orient Chemical Industries, Ltd., BASF Japan Ltd., and the like.

Examples of the dispersible dye include each product number of C.I. Disperse Yellow, C.I. Disperse Orange, C.I. Disperse Red, C.I. Disperse Violet, C.I. Disperse Blue, and C.I. Disperse Green. Among these, preferable dyes are C.I. Solvent Yellow 29 and 30 for yellow, C.I. Solvent Blue 79 for cyan, C.I. Solvent Red 18 and 49 for magenta, and C.I. Solvent Black 3 and 7 and nigrosin black dye for black. Note that examples of the hydrophobic dye are not necessarily limited to these listed above.

The coloring agent for use in the present invention is preferably dissolved in an organic solvent such as a ketone solvent at a rate of 2 g/L or higher, more preferably at a rate of 20 g/L to 600 g/L, in view of efficient impregnation into polymer fine-particles. Examples of a polymer comprised of the polymer emulsion include vinyl polymer, polyester polymer, polyurethane polymer, and the like. Especially, vinyl polymer and polyester polymer are preferably used, and their specific examples are the polymers disclosed in JP-A Nos, 2000-53897, and 2001-139849.

The content of the coloring agent is preferably 10 parts by mass to 200 parts by mass, more preferably 25 parts by mass to 150 parts by mass with respect to 100 parts by mass of the polymer. The average particle diameter of the polymer fine particles containing the coloring agent is preferably 0.16 μm or less in the ink.

The solids content of the polymer fine particles is preferably 8% by mass to 20% by mass, more preferably 8% by mass to 12% by mass in the ink.

-Surfactant-

The present invention achieves the significant improvements in wettability, and permeability to the recording medium by adding a surfactant, especially a fluorochemical surfactant having a certain structure. This particular fluorochemical surfactant having a certain structure has characteristics those dissimilar to the ones of the conventional fluorochemical surfactant. The conventional fluorochemical surfactant tends to have high foamability, and most of the available conventional fluorochemical surfactants are prone to form bubbles. It has been known in the art that this foamability adversely affects loading ability of the ink or ejecting stability of the ink. However, the fluorochemical surfactant having a certain structure for use in the present invention maintains its foamability very low, and thus the obtained ink has excellent loading ability, ejecting stability, and safety. In addition, the obtained ink has high coloring ability and uniform dispersibility of the coloring agent on a recording medium for inkjet recording for use in the present invention. Because of this particular effect in permeability, occurrences of beading are prevented, and thus excellent images can be formed. The precise mechanisms thereof have not yet been completely found out, but it is assumed that the fluorochemical surfactant having a certain structure has excellent leveling performance, and exhibits a high effect in leveling a surface tension at an interfere between air and liquid, due to its structure. Moreover, it is understood that this characteristic bring a high effect in preventing to form bubbles, and this high leveling performance on the recording medium leads an effect in uniformly dispersing the coloring agent, and uniformly wetting and spreading a diameter of a picture element, and as a result, the occurrence of beading is greatly inhibited. Based on these understandings, it is assumed that prints of high quality, excellent density, glossiness, and image reliability, which is similar to those of commercial printing, can be attained at low cost, by combining the recording medium for inkjet recording described in the present specification and the pigment ink of inkjet recording described in the present specification. Moreover, from the same reasons, there can be provided the desirable ink for inkjet recording, ink set for inkjet recording, ink media set for inkjet recording, ink cartridge, inkjet recording method, and inkjet recording apparatus having reliability for preventing clogging, and storage stability.

The compound expressed by the following structural formula 1 is a surfactant particularly suitable for use in the present invention.

Structural formula 1

In the structural formula 1, each of $R_1$ and $R_2$ denotes either a hydrogen atom or a group containing a fluorine atom, each of $R_3$ and $R_4$ denotes a group containing a fluorine atom, and each of e, m, p, q, and r denotes an integer.

Other than using the fluorochemical surfactant expressed by the structural formula 1 alone, the florochemical surfactant expressed by the structural formula 1 can be used in combination with the following fluorochemical surfactants in the present invention. Examples of such fluorochemical surfactants include perfluoroalkylsulfonate, perfluoroalkylcarboxylate, perfluoroalkylphosphate, perfluoroalkylethyleneoxide adducts, perfluoroalkylbetaine, perfluoroalkylamineoxide compounds, and the like. Examples of the commercially available products of such fluorochemical surfactants include: Surflon S-111, S-112, S-113, S-121, S-131, S-132, S -141, and S-145 (manufactured by Asahi Glass Co., Ltd.); FLUORAD FC-93, FC-95, FC-98, FC-129, FC-135, FC-170C, FC-430, FC-431, and FC4430 (manufactured by Sumitomo 3M Limited); Megafack F-470, F-1405, and F-474 (manufactured by Dainippon Ink & Chemicals Inc.); Zonyl FS-300, FSN, FSN-100, FSO (manufactured by DuPont Kabushiki Kaisha); EFTOP EF-351, EF-352, EF-801, and EF-802 (manufactured by JEMCO Inc). Among them, Zonyl FS-300, FSN, FSN-100, and FSO (manufactured by DuPont Kabushiki Kaisha) are particularly preferable in view of excellent reliability and improved color development.

Other examples of the surfactants which can be used in combination with the above-mentioned fluorochemical surfactant include surfactants such as polyoxyethylenealkyletheracetate, dialkylsulfosuccinate, polyoxyethylenealkylether, polyoxyethylenealkylphenylether, a polyoxyethylene-polyoxypropylene block copolymer, polyoxyethylenealkylester, polyoxyethylene sorbitan fatty acid ester, acetylene glycol, and the like. Specifically, by using polyoxyethylenealkyletheracetate and/or dialkylsulfosuccinate having a C5-7 branched alkyl chain, the wettability is improved towards normal paper. These surfactants listed above can be stably present in the ink of the present invention without adversely affecting the dispersing condition of the ink.

-Penetrating Agent-

The penetrating agent for use in the present invention is C7-11 polyol, or the like. Examples of C7-11 polyol include 2-ethyl-1,3-hexandiol, 2,2,4-trimethyl-1,3-pentandiol, and the like. The content of the penetrating agent is preferably 0.1% by mass to 20% by mass, more preferably 0.5% by mass to 10% by mass. In the case where the content of the penetrating agent is less than the above-mentioned range, the penetration of the ink into the paper may be decreased, and this may cause soiling on the paper as a result of the friction caused by a roller at the time of transferring the paper, or may cause soiling on the transferring belt at the time of reversing the side of the paper for the purpose of double-side printing. Therefore, such ink cannot be used for high-speed printing, or double-side printing. In the case where the content is more than the above-mentioned range, a diameter of printed dots

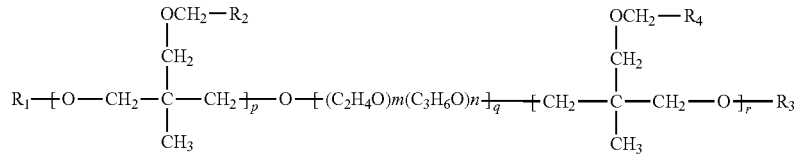

becomes excessively large, and thus line width of character becomes wide or image definition is lowered.

-Solid Moisture Retainer-

The second embodiment of the ink of the present invention contains dipeptide as a solid moisture retainer, and by adding the dipeptide which is at least one selected from the group consisting of alanyl glutamine, glycyl glutamine, bisalanylcystine, and bisglycylcystine to the ink, all of the reliability for preventing clogging, the reliability for transferring a recording medium, e.g. prevention of beading or cockling, and the image reliability are attained at the same time.

The solid moisture retainer defines a compound which has moisture retaining functions, is a solid water-soluble compound at a room temperature of 25° C., is dissolved or partially dissolved in the vehicle of the ink, and does not adversely affect the dispersion stability of the pigment (not causing aggregation of the pigment) contained in the ink.

Among dipeptide used as the solid moisture retainer, alanyl glutamine has extremely high water-solubility at 20° C. or lower compared to conventional amino acids, and does not adversely affect the dispersion stability of the pigment at the time being added to the ink. Moreover, alanyl glutamine can be added to the ink at 1 part by mass to 20 parts by mass, preferably 3 parts by mass to 10 parts by mass in solids content. In the case where the solids content is less than 1 part by mass in the ink, the effect of preventing clogging cannot be attained. In the case where the solids content is more than 20 parts by mass, the viscosity of the ink becomes excessively high, and thus it affects stability for preventing clogging. In the present invention, dipeptide contributes the stability of the ink for preventing clogging. This is probably because dipeptide has high water-solubility, is stably dissolved in the ink due to its water-solubility, and thus does not adversely affect the dispersion stability of the pigment as the coloring agent. Moreover, dipeptide is present in the ink while having weak compatibility to the pigment, and thus it is assumed that dipeptide also functions as a dispersion stabilizer in the ink. Dipeptide also has an effect in retaining moisture. For example, alanine is a natural moisture retaining substance present in a horny layer of humans, glutamine is a substance easily absorbed in cells of humans, and alanyl glutamine which is comprised both alanine and glutamine is a highly safe moisture retaining substance widely used for cosmetic products, and medicines of skins for external application. It is assumed that these high moisture retaining abilities of dipeptide contribute to a stability of the ink for preventing clogging in combination with its water-solubility contributing to the pigment dispersion. Specifically, water retaining ability of the ink is maintained even the ink is present adjacent to the nozzle, and aggregations of the pigments are prevented at the time of drying. As a result, a significantly high reliability of the ink for preventing clogging can be exhibited. With regard to the image reliability, dipeptide contributes to improve fixing ability of the ink of the present invention having low absorption ability to the recording medium, to lower occurrence of beading, and to prevent curling or cockling at the time of printing as a moisture content of the ink is relatively reduced. This is because dipeptide can be added to the ink at a large amount in solids content, without adversely affecting the dispersion condition of the pigment and penetration of the ink into low price recording mediums, and a moisture content of the ink can be relatively reduced. It is assumed that significant effects are exhibited against the problems to be solved in the present invention, by using the particular ink and the particular recording medium in combination in the present invention.

The above-mentioned expression "a moisture content of the ink is relatively reduced" means a relative moisture content of the ink which dipeptide is not included is reduced inversely proportional to the solids content of dipeptide to be added, by adding dipeptide to the ink.

-Water-Dispersible Resin-

The water-dispersible resin for use in the first embodiment of the ink of the present invention is preferably at least one selected from the group consisting of polyurethane resin emulsion, and acryl-silicone resin emulsion. These may be used in combination. At the time of using the water-dispersible resin as a raw material in course of preparing the ink, or after preparing the ink, the water-dispersible resin is present as an oil in water emulsion.

In the case where at least one of the above-listed water-dispersible resins is used, the solids content of the emulsion in the ink is 1% by mass to 40% by mass, preferably 1% by mass to 20% by mass.

Examples of the polyurethane resin emulsion include the one wherein a relatively hydrophilic polyurethane resin is externally added with an emulsifier to thereby emulsified, and a self-emulsified emulsion wherein a functional group served as an emulsifier is introduced into a resin by copolymerization or the like. An anionic self-emulsified polyurethane resin emulsion always has excellent dispersion stability, considering the combination with the pigments selected for use in the present invention. The anionic self-emulsified polyurethane resin emulsion has preferably an ether type of polyurethane resin, rather than polyester or polycarbonate type thereof, in terms of fixing ability to the pigment and dispersion stability. Although specific reasons have not yet been known, the non-ether type thereof tends to have weak solvent resistance, and tends to cause aggregation or increase in the viscosity when the ink is stored at a high temperature.

An average particle diameter of the ether type of polyurethane resin emulsion is 300 nm or less, preferably 100 nm or less, more preferably 80 nm or less. By controlling the average particle diameter specifically 100 nm or less, a reliability of the inkjet recording apparatus, e.g. ink ejecting stability after storing for a long period, is improved.

The glass transition temperature of the ether type of polyurethane resin emulsion is preferably in the range of −50° C. to 150° C., more preferably in the range of −10° C. to 100° C. In the case where the glass transition temperature thereof is more than 150° C., a film formed with the ether type of polyurethane resin emulsion becomes hard like a glass, but the pigment particles and the ether type of polyurethane resin emulsion come to an impact with a recording medium at the same time at the time of printing, and thus obtained image has relatively low abrasion resistance. In the case where the glass transition temperature is 150° C. or less, a film formed with the ether type of polyurethane resin emulsion is soft, and rubber like, but has excellent abrasion resistance. If the glass transition temperature is less than −50° C., the film however becomes excessively soft, and the abrasion resistance is lowered. Therefore, it was found that the preferable range of the glass transition temperature was from −50° C. to 150° C. in view of the abrasion resistance of the print. In the present invention, the glass transition temperature of the resin can be measured either by a differential scanning calorimeter (DSC) or thermomechanical analysis (TMA).

The minimum film forming temperature of the ether type of polyurethane resin emulsion is preferably a room temperature or lower, more preferably 25° C. or lower. It is preferred that a film formation of the ether type of polyurethane resin emulsion is carried out at a room temperature or lower, especially at 25° C. or lower, since the bonding to the fibers in the paper is automatically performed without proceeding any special treatment such as heating or drying.

The minimum film forming temperature (MFT) is defined as a minimum temperature to form a transparent continuous film when an aqueous emulsion particles obtained by dispersing the ether type of polyurethane emulsion particles in water is thinly coated onto a metal plate such as aluminum and the temperature is rose so as to form a transparent continuous film.

The acryl-silicone resin emulsion for use in the present invention is explained hereinafter.

Examples of the acryl-silicone resin emulsion include silicone-modified acrylic resin emulsion which is obtained by polymerizing acrylic monomer and a silane compound in the presence of an emulsifier.

Examples of the acrylic monomer include: acrylic ester monomers such as methyl acrylate, ethyl acrylate, butyl acrylate, 2-ethylhexyl acrylate, 2-hydroxyethyl acrylate, acrylyl morpholine, N,N'-dimethylaminoethyl acrylate, and the like; methacrylic ester monomers such as methyl methacrylate, ethyl methacrylate, butyl methacrylate, 2-ethylhexyl acrylate, 2-hydroxyethyl methacrylate, N,N'-dimethylaminoethyl mathacrylate, and the like; amide acrylate such as N-methylol acrylamide, methoxymethylacrylamide, and the like; carboxylic acid containing monomers such as maleic acid, fumaric acid, itaconic acid, acrylic acid, methacrylic acid, and the like.

Examples of the emulsifier include alkylbenzenesulfonic acid and their salt, dialkylsulfosuccinic ester and their salt, alkylnaphthalenesulfonic acid and their salt, alkylnaphthalenesulfonic acid salt formalin condensates, higher fatty acid salt, higher fatty acid ester sulfonic acid salt, ethylenediamine polyoxypropylene-polyoxyethylene condensates, sorbitan fatty acid ester and their salt, aromatic and aliphatic phosphoric acid ester and their salt, dodecylbenzenesulfonate, dodecylsulfate, laurylsulfate, dialkylsulfosuccinate, polyoxyethylenealkylphenylethersulfate, polyoxyethynealkylpropenylphenylethersulfate, alkylphenyletherdisulfonate, polyoxyethylenealkylphosphate, polyoxyethylenealkyletheracetate, polyoxyethylenelanoline alcohol ether, polyoxyethylenelanoline fatty acid ester, laurylalcohol ethoxylate, lauryl ether sulfuric ester salt, lauryletherphosphoric ester, sorbitan fatty ester, fatty diethanolamide, naphthalenesulfonic acid formalin condensates, and the like. Examples of the salt include sodium, ammonium, and the like.

As the emulsifier, a reactive emulsifier having an unsaturated double bond may be used in the present invention. Examples of the reactive emulsifier include commercially available Adekalia soap SE, NE, PP (manufactured by Adeka Corporation), LATEMUL S-180 (manufactured by Kao Corporation), ELEMINOL JS-2, ELEMINOL RS-30 (manufactured by Sanyo Chemical Industries, Ltd.), and Aquaron RN-20 (manufactured by Dai-ichi Kogyo Seiyaku Co., Ltd.)

Examples of the silane compound include tetramethoxysilane, methyltrimethoxysilane, dim ethyldimethoxysilane, phenyltrimethoxysilane, diphenyldimethoxysilane, tetraethoxysilane, methyltriethoxysilane, dimethyldiethoxysilane, phenyltriethoxysilane, diphenyldiethoxysilane, hexyltrimethoxysilane, hexyltriethoxysilane, decyltrimethoxysilane, decyltriethoxysilane, trifluoropropyltrimethoxysilane, and the like.

Monomers generally known as silane coupling agents may be used as the silane compound, examples of which monomers include vinyltrichlorsilane, vinyltrimethoxysilane, vinyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, -methacryloxypropyltriethoxysilane, 3-acryloxypropyltrimethoxysilane, N-2(aminoethyl) 3-aminopropylmethyldimethoxysilane, N-2(aminoethyl) 3-aminopropyltrimethoxysilane, N-2(aminoethyl) 3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, N-(vinylbenzyl)-2-aminoethyl-3-aminopropyltrimethoxysilane hydrochloric acid salt, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanate propyltriethoxysilane, and the like.

The hydrolyzable silyl group refers to a silyl group containing a hydrolyzabile group in the present invention. Examples of the hydrolyzable group include alkoxy, mercapto, halogen, amide, acetoxy, amino, isopropenoxy groups, and the like.

The silyl group is hydrolyzed and becomes a silanol group, which is dehydrated and condensed, and a siloxane bond generated. In the present invention, the hydrolyzable silyl group in the silicone modified acrylic resin is hydrolyzed via the polymerization reaction and disappears, so there is no hydrolyzable silyl group in the silicone modified acrylic resin. If the hydrolyzable silyl group remains, when it is used in making the recording ink, the storage properties may deteriorate.

The resin fine-particles preferably have a volume average particle diameter of 10 nm to 300 nm, more preferably 40 nm to 200 nm. If the volume average particle diameter is less than 10 nm, the resin emulsion has a higher viscosity. Therefore, it is sometimes difficult to obtain an ink viscosity dischargeable in an inkjet printer. If the average particle diameter is more than 300 nm, a nozzle of the printer may be clogged with the particles, causing ejection malfunction.

Further, for the quantity of silicone originating from the silicone modified acrylic resin in the recording ink, 100 ppm to 400 ppm is preferable, and 100 ppm to 300 ppm is more preferable. If the quantity of the silicone is less than 100 ppm, a coating with excellent abrasion properties and marker resistance may not be obtained, and if it is more than 400 ppm, the tendency of hydrophobicity becomes greater and thus the stability in the aqueous ink may deteriorate.

For the minimum film forming temperature (MFT) of the silicone modified acrylic resin not containing the hydrolyzable silyl group, 20° C. or less is preferable, and 0° C. or less is more preferable. If the minimum film forming temperature is more than 20° C., sufficient fixation may not be obtained, and when the printed portion is rubbed or traced with a marker pen, the pigment is removed and the recording medium may be smeared.

In the present invention, it is preferable that a total amount of the water-dispersible resin and the pigment as the coloring agent is 5% by mass to 40% by mass in the ink, and a mass ratio A/B of the water-dispersible resin A to the pigment B is 0.5 to 4, preferably 1 to 2.5. Prints having high fixing ability and textures close to those of commercial printing can be attained on the low-priced recording medium for use in the present invention, by combining the ink and the recording medium described in the present specification.

In the second embodiment of the ink of the present invention, solids mass of the dipeptide in the ink is preferably 1 part by mass to 20 parts by mass, more preferably 3 parts by mass to 10 parts by mass. Moreover, the ink further needs to satisfy the abovementioned amount and ratio of the water-dispersible resin and the pigment as the coloring agent relative to the total solids content of the ink, in order to satisfy the objects of the present invention.

Specifically, the solids content of the water-dispersible resin and the pigment as the coloring agent needs to be 5% by mass to 40% by mass relative to the total solids contents of the ink. If the solids content is less than 5% by mass, fixing ability and the like become insufficient against the recording medium for use in the present invention. If the solids content is more than 40% by mass, the viscosity of the ink is excessively increased, and thus reliability such as for ejection of the ink may be adversely affected. The solids content is more preferably 5% by mass to 20% by mass. Moreover, resin dispersion, and a resin-coated pigment can be used in the ink, depending on the selection of the coloring agent. In this case, the resin dispersion and resin component of the resin-coated particle are counted as a resin component of the ink, together with the water-dispersible resin.

As mentioned above, the ratio AB is 0.5 to 4. If the ratio is less than 0.5, fixing ability and the like become insufficient against the recording medium for use in the present invention. If the ratio is more than 4, a density of the coloring agent is excessively low against the resin, and thus it may lower the image quality, such as lowering the density, uniformity of the image, and the like. Therefore, the important structural requirements of the ink of the present invention are to add 1 part by mass to 20 parts by mass, preferably 3 parts by mass to 10 parts by mass, of the dipeptide as the solid water retainer to the ink in solids content, to satisfy the range of 5% by mass to 40% by mass of the total amount of the water-dispersible resin and the pigment as the coloring agent relative to the total solids of the ink, and to have a mass ratio AB of the water-dispersible resin A to the pigment as the coloring agent B.

-Water-Soluble Organic Solvent-

Specific examples of the water-soluble organic solvent for use in the present invention are as follow: polyvalent alcohols such as ethylene glycol, diethylene glycol, triethylene glycol, propylene glycol, dipropylene glycol, tripropylene glycol, tetraethylene glycol, polyethylene glycol, polypropylene glycol, 1,3-butanediol, 2-methyl-1,3-butanediol, 3-methyl-1,3-butanediol, 2,3-butanediol, 1,4-butanediol, 1,5-pentanediol, 1,6-hexanediol, glycerol, 1,2,6-hexanetriol, 1,2,4-butanetriol, 1,2,3-butanetriol, 2-methyl-2,4-pentanediol, petriol, 3-methoxy-3-methyl-1-butanediol, and the like; polyvalent alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether, and the like; polyvalent alcohol aryl ethers such as ethylene glycol monophenyl ether, ethylene glycol monobenzyl ether, dipropylene glycol monobutyl ether, tripropylene glycol monobutyl ether, diethylene glycol isobutyl ether, triethylene glycol isobutyl ether, diethylene glycol isopropyl ether, and the like; nitrogen-containing heterocyclic compounds such as 2-pyrrolidone, N-methyl-2-pyrrolidone, N-hydroxyethyl-2-pyrrolidone, 1,3-dimethylimidazolidinone, s-caprolactam, γ-butyrolactone, and the like; amides such as formamide, N-methylformamide, formamide, N,N-dimethylformamide, and the like; amines such as monoethanolamine, diethanolamine, triethanolamine, monoethylamine, diethylamine, triethylamine, and the like; sulfur-containing compounds such as dimethylsulfoxide, sulfolane, thiodiethanol, thiodiglycol, and the like; propylene carbonate, ethylene carbonate, and the like.

Among them, from the standpoint of obtaining excellent efficacy in preventing ejection characteristic failure due to solubility and moisture evaporation, glycerin, ethylene glycol, diethylene glycol, triethylene glycol, propylene glycol, dipropylene glycol, tripropylene glycol, 1,3-butanediol, 2-methyl-1,3-butanediol, 3-methyl-1,3-butanediol, 2,3-butanediol, 1,4-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, thiodiglycol, 2-pyrrolidone, N-methyl-2-pyrrolidone, N-hydroxyethyl-2-pyrrolidone, or 1,3-dimethyl-2-imidazolidinone is suitable.

The other components are not particularly limited and may be appropriately selected according to the purpose. For example, fungicides, rust prevention agents, pH adjusters, and the like may be used. By using 1,2-benzisothiazolin-3-one as the fungicide, there can be provided an ink having excellent performance of the fungicide, while maintaining reliability such as storage stability, ejection stability, and the like. Especially when the above-mentioned fungicide is used in combination with the solid water retainer mentioned in the present specification, the fungicide can exhibit sufficient effects at the addition amount which is conventionally considered as an insufficient amount for prevent generation of bacteria or fungi. By maintaining the addition amount of the fungicide at the minimum, phenomena such as aggregations of the particles or increased viscosity of the ink can be prevented. Therefore, such ink is capable of exhibiting the excellent performances as the ink for a long-period of time. The content of 1,2-benzisothiazolin-3-one, as a content of an active ingredient, is preferably 0.01 parts by mass to 0.04 parts by mass with respect to the total amount of the ink. If the content is less than 0.01, the effects of the fungicide cannot be sufficiently exhibited. If the content is more than 0.04 parts by mass, problems may occur in long-term storage stability, such as causing aggregations of the pigment or increasing the viscosity of the ink at 50% to 100% compared to the initial viscosity thereof after storing the ink for a long period, e.g. for two years at a room temperature, or one to three months at 50-60° C., and the performances at initial printing cannot be maintained.

The pH adjusters are not particularly limited and any substances may be used according to the purpose as long as they can be used to adjust the pH for 7 or higher without adverse effects on the ink to be prepared.

Examples of the pH adjusters include amines such as diethanolamine and triethanolamine, alkali metal hydroxides such as lithium hydroxide, sodium hydroxide, and potassium hydroxide; ammonium hydroxide, quaternary ammonium hydroxide, quaternary phosphonium hydroxide, alkali metal carbonates such as lithium carbonate, sodium carbonate, potassium carbonate, and the like.

Examples of the rust prevention agents include acidic sulfite, sodium thiosulfate, anmone thioglycolate, diisopropylammoniumnitrite, pentaerythritol tetranitrate, dicyclohexylammoniumnitrite, and the like.

Water-soluble ultraviolet absorbers, water-soluble infrared absorber may be further added, depending on the purpose.

[Inkjet Recording]

In the present invention, a total amount of the ink is precisely restricted for the purpose of maintaining a drying property of the ink, while preventing the pigment of the ink from penetrating into the recording medium so as to make the pigment efficiently locate the area adjacent to the surface of the recording medium. In the case of the conventional inkjet printing where a large amount of the ink is used, the functions of the barrier layer for separation the pigment coloring agent from the ink cannot be sufficiently performed and thus the pigment coloring agent is penetrated together with the solvent of the ink, or the solvent of the ink is not dried at a sufficient speed and thus the drying property is lowered. In order to sufficiently exhibit the functions of the barrier layer, the maximum total amount of the ink is 15 g/m$^2$ or less, preferably 12 g/m$^2$ or less. The amount of the ink can be easily controlled. By reducing the total amount of the ink required for printing, a size of an ink cartridge can be reduced compared to the size of the ink cartridge in the conventional inkjet printer. Therefore, it is possible to downsize an inkjet recording apparatus. In the case where an ink cartridge in size of the conventional cartridge is used, the frequency of exchanging the ink cartridge is reduced. Therefore, printing can be conducted at low cost in this case. As a general principle, the function of the barrier layer for separating the pigment from the ink is more efficiently exhibited as the total amount of the ink is smaller. However, if the total amount of the ink is excessively small, there is a drawback such that image dots become small after printing. Therefore, it is preferable to adjust the total amount of the ink within the above-mentioned range depending images to be obtained.

In the present invention, the total amount of the ink is measured in accordance with a weighting method. Specifically, a 5 cm×20 cm rectangular is printed on Type 6200 (manufactured by Ricoh Company Limited) which is a plain paper for copiers (PPC). The mass of the paper just after printing was measured, and a mass of the paper before printing was deducted from the thus obtained value. 100 times of the obtained value was defined as the total amount of the ink.

The ink having high permeability of the present invention can be used for printing on the conventional porous recording media for inkjet printing. However, in this case, the absorption speed of the ink is excessively high compared to the case where printing is performed on the recording medium for use in the present invention. Therefore, after that a droplet of the ink is dropped on a surface of the paper, the solvent of the ink is penetrated into the ink before the droplet is spread on the surface, and thus a diameter of the dot becomes small. As a result, lowered density or increased granular textures tends to be caused. In order to obtain a high quality image on PPC, it is necessary to perform printing by lowering resolution compared to the case when printing is performed on the recording medium for used in the present invention. However, if the resolution is lowered, the printing speed is slowed, or a consumption of the ink is increased. Therefore, it is more preferably to use the recording medium for use in the present invention, together with the ink for inkjet printing of the present invention.

The ink of the ink media set of the present invention is suitably used in printers provided with any types of inkjet heads including a piezo-type in which a piezoelectric element is used to pressurize ink in the ink passage, a diaphragm forming the wall of the ink passage is deformed to change the inner volume of the ink passage, thereby discharging ink droplets (Japanese Patent Application Laid-Open (JP-A) No. 02-51734), a thermal type in which an exothermic resistor is used to heat ink in the ink passage to produce bubbles (Japanese Patent Application Laid-Open (JP-A) No. 61-59911), and an electrostatic type in which a diaphragm forming the wall of the ink passage and electrodes are placed at facing positions and electrostatic force is produced between the diaphragm and the electrodes to deform the diaphragm and change the inner volume of the ink passage, thereby discharging ink droplets (Japanese Patent Application Laid-Open (JP-A) No. 1994-71882).

As mentioned above, the recording medium of the ink media set of the present invention is used together with the ink of the ink media set of the present invention. This combination of the recording medium and the ink is suitably used in various fields, and is suitably used in an image recording apparatus, e.g. a printer, for inkjet recording. For example, this combination of the recording medium and the ink is suitably used for the ink cartridge, ink printed matter, inkjet recording apparatus, and inkjet recording method of the present invention which will be described below.

(Ink Cartridge)

The ink cartridge of the present invention contains a container containing the ink of the present invention therein, and further contains other appropriated selected members as required.

The container is not particularly limited and its shape, structure, size, and material are appropriately selected according to the purpose. Preferred embodiments include those at least having an ink pouch formed by aluminum laminated film or resin film.

Figure 2:
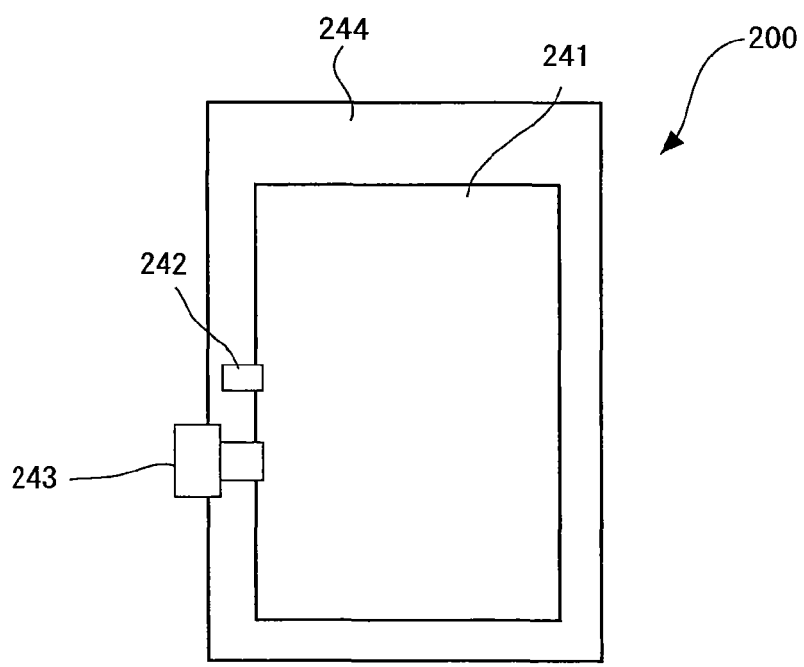
FIG. 2 schematically shows an exterior of the ink cartridge of FIG. 1 including a casing thereof.

The ink cartridge is hereinafter described with reference to FIGS. 1 and 2. FIG. 1 is an illustration showing an embodiment of the ink cartridge of the present invention. FIG. 2 is an illustration of the ink cartridge of FIG. 1 including a casing (exterior).

In an ink cartridge 200, as shown in FIG. 1, an ink pouch 241 is filled through an ink inlet 242. The ink inlet 242 is closed by fusion bonding after the air is exhausted. An ink outlet 243 made of a rubber material is pierced by a needle on the apparatus body for use, thereby the ink is supplied to the apparatus. The ink pouch 241 is formed by a packaging member such as a non-permeable aluminum laminated film. The ink pouch 241 is housed in a cartridge case 244 generally made of plastics as shown in FIG. 2 and detachably mounted on various types of inkjet recording apparatus.

The ink cartridge of the present invention contains the ink of the ink media set of the present invention. The ink cartridge of the present invention can be detachably mounted on variety types of inkjet recording apparatus and it is particularly preferable that the ink cartridge of the present invention is detachably mounted on the inkjet recording apparatus of the present invention described below.

(Inkjet Recording Apparatus and Inkjet Recording Method)

The inkjet recording apparatus of the present invention contains the ink media set for inkjet recording of the present invention and an ink ejecting unit, and may further contain appropriately selected other units, such as a stimulus applying unit, a controlling unit, and the like.

The inkjet recording method of the present invention uses the ink media set for inkjet recording of the present invention, and contains a step of ejecting the ink. The inkjet recording method of the present invention may further contain appropriately selected other steps, such as a step of applying stimulus, a step of controlling, and the like, if necessary.

The inkjet recording method of the present invention is suitable performed by means of the inkjet recording apparatus of the present invention, and the step of ejecting the ink is suitably performed by means of the ink ejecting unit. Moreover, the above-mentioned other steps are suitably performed by means of the above-mentioned other units.

As mentioned above, the inkjet recording method contains a step of ejecting the ink, which is to apply a stimulus to the ink for inkjet recording, so as to eject the ink.

The step of ejecting the ink is to apply a stimulus to the ink of the ink media set of the present invention, and to eject the ink to the recording medium of the ink media set of the present invention, so as to form an image.

The ink ejecting unit is configured to apply a stimulus to the ink of the ink media set of the present invention, and to eject the ink so as to form an image on the recording medium of the ink media set of the present invention. The ink ejecting unit is not particularly limited, and examples thereof include various nozzles for ejecting an ink, and the like.

It is preferable that the liquid chamber, fluid dragging part, diaphragm, and nozzle member of the nozzle head part be at least partly made of materials containing at least either silicon or nickel.

The nozzle diameter of the nozzle head part is preferably 30 μm or less, more preferably 1 μm to 20 μm.

It is preferable that subtanks for supplying ink be provided on the inkjet head and the ink is supplied to the subtanks from the ink cartridge via supply tubes.

In the inkjet recording method of the present invention, the maximum deposition amount of the ink is preferably 8 g/m$^2$ to 20 g/m$^2$ at the resolution of 300 dpi or more.

The stimulus is generated, for example, by the stimulus applying unit. The stimulus is appropriately selected depending on the purpose without any restriction. Examples of the stimulus include heat, pressure, vibration, light, and the like. One of them may be used alone, or two or more of them may be used in combination. Among them, heat, and pressure are particularly suitable.

Examples of the stimulus applying unit are a heating apparatus, a pressurizing apparatus, a piezoelectric element, a vibration generation apparatus, an ultrasonic oscillator, a light, and the like. Specific examples thereof include a piezoelectric actuator such as a piezoelectric element, a thermal actuator using an electrothermal conversion element such as an exothermic resistor to cause film boiling and, accordingly, phase change of a liquid, a shape-memory alloy actuator using metal phase changes due to temperature changes, an electrostatic actuator using electrostatic force, and the like.

An embodiment of the ejection of the ink of the ink media set is appropriately selected depending on the stimulus to be applied, without any restriction. For example, in the case where the stimulus is "heat," thermal energy corresponding to recording signals is applied to the ink in the recording head, for example, using a thermal head, the thermal energy causes the ink to bubble, and the bubble pressure urges the ink to be ejected as ink droplets from the nozzle hole of the recording head. In the case where the stimulus is "pressure," for example, an electric voltage is applied to a piezoelectric element bonded at a position called a pressure chamber within the ink passage of the recording head, the piezoelectric element is bent, the pressure chamber is reduced in volume, and thus the ink is ejected as droplets from the nozzle hole of the recording head.

The droplet of the ink to be ejected preferably has a size of 1 pl to 40 pl, an ejection speed of the ink is preferably 5 m/sec. to 20 m/sec., a driving frequency is preferably 1 kHz or higher, and a resolution is preferably 300 dpi or higher.

The controlling unit is appropriately selected without any restriction, provided that it is capable of controlling the motions of each units described above. Examples of the controlling unit include devices such as a sequencer, a computer, and the like.

An embodiment of the inkjet recording method of the present invention by means of the inkjet recording apparatus of the present invention is described hereinafter, with reference to the drawings. An inkjet recording apparatus shown in FIG. 3 contains an apparatus body 101, a feeder tray 102 attached to the apparatus body 101 for feeding papers, a paper output tray 103 attached to the apparatus body 101 for receiving papers on which images are recorded (formed), and an ink cartridge mounting part 104. An operation part 105 having operation keys and indicators is provided on the top surface of the ink cartridge mounting part 104. The ink cartridge mounting part 104 has front cover 115 that can be opened and/or closed to remove and/or place ink cartridges 200.

Figure 4:
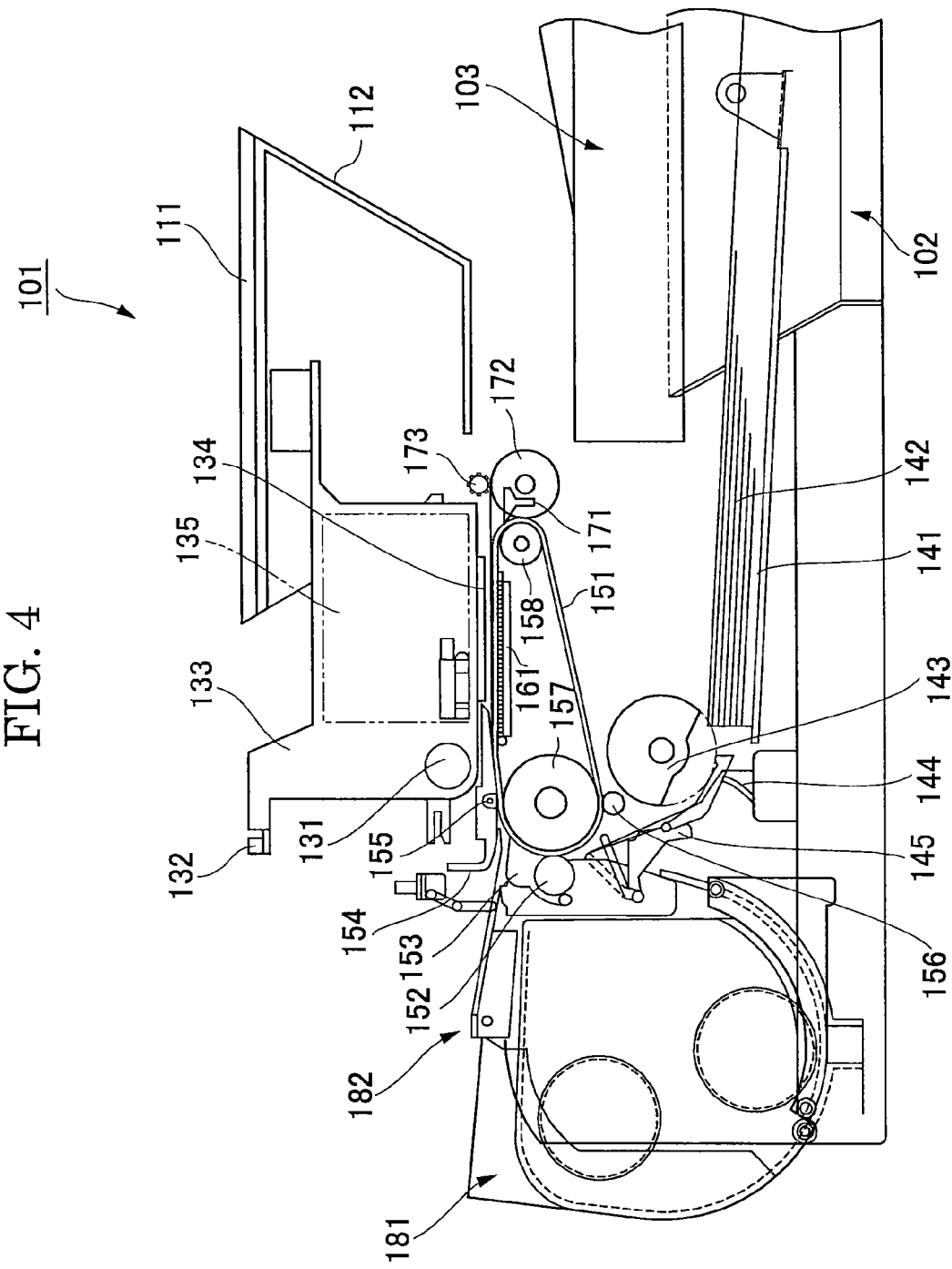
FIG. 4 schematically shows an example of an entire construction of the inkjet recording apparatus.
Figure 5:
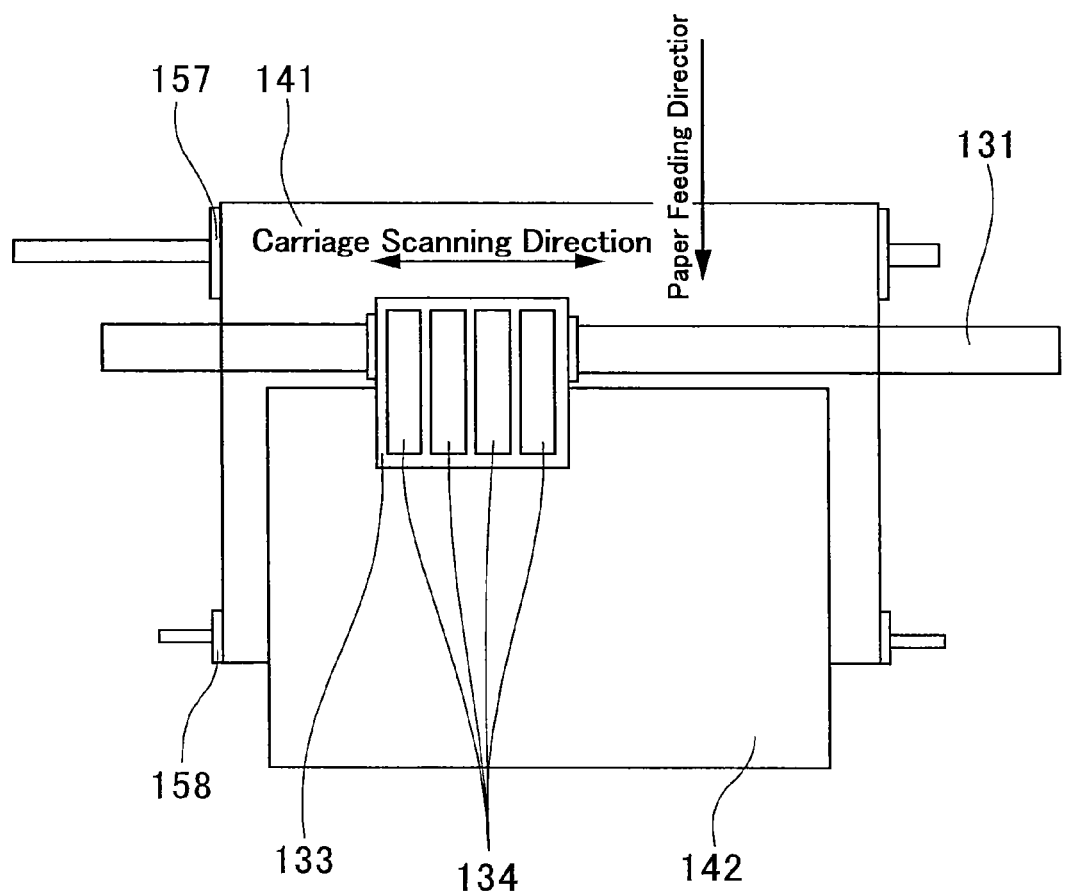
FIG. 5 schematically shows an enlarged view of an example of an inkjet head suitable for use in the inkjet recording apparatus of the present invention.

As shown in FIGS. 4 and 5, a carriage 133 is supported slidably in the scan direction by guide rod 131 that is a guide member laid across not shown right and left side plates and stay 132 and moved by a main motor (not shown) in the arrowed directions in FIG. 5 for scanning within the apparatus body 101.

Recording heads 134 consisting of four inkjet recording heads that eject yellow (Y), cyan (C), magenta (M), and black (B) recording ink droplets, respectively, have ink ejection ports arranged in the intersecting direction with the main scanning direction and they are placed in the carriage 133 with their ink ejection direction downward.

Inkjet recording heads constituting the recording heads 134 are provided with an energy generation unit for ejection the ink such as a piezoelectric actuator such as an piezoelectric element, a thermal actuator using an electrothermal conversion element such as an exothermic resistor to cause film boiling and, accordingly, phase change of a liquid, a shape-memory alloy actuator using metal phase changes due to temperature changes, and an electrostatic actuator using electrostatic force.

The carriage 133 is provided with subtanks 135 for supplying each color ink to the recording heads 134. The subtanks 135 are filled with the recording ink of the present invention from the ink cartridge 201 of the present invention mounted in the ink cartridge mounting part 105 via a not-shown recording ink supply tube. A paper feed part for feeding paper 142 stuck on paper load part (platen) 141 of the feed tray 102 comprises a half-moon roller (feed roller 143) that separates and supplies the paper 142 from the paper load part 141 one by one and separation pad 144 that faces the feed roller 143 and is made of a large friction coefficient material. The separation pad 144 is biased toward the feed roller 143.

A conveying part for conveying the paper 142 supplied from the feed part underneath the recording heads 134 comprises a conveying belt 151 for electrostatically adsorbing and conveying the paper 142, counter roller 152 for conveying the paper 142 sent from the paper feed part via guide 145 by clamping it together with the conveying belts 151, conveying guide 153 for turning the paper 142 sent nearly vertically by 90° so as to lay it on the conveying belt 151, and leading end pressure roller 155 that is biased toward the conveying belt 151 by presser member 154. Charging roller 156 that is a charging unit for charging the surface of the conveying belt 151 is also provided.

The conveying belt 151 is an endless belt, being placed over conveying roller 157 and a tension roller 158 and running around in the belt conveying direction. For example, the conveying belt 151 has a front layer that is a paper adsorbing surface made of a dragging-uncontrolled resin, for example a copolymer of tetrafluoroethylene and ethylene (ETFE), having a thickness of 40 μm and a back layer (an intermediate dragging layer or an earth layer) made of the same material as the front layer, but dragging-controlled with carbon. Guide member 161 is provided behind the conveying belt 151 at the corresponding position to the printing area by the recording heads 134. An output part for discharging the paper 142 on which recording was done by the recording heads 134 comprises separation click 171 for separating the paper 142 from the conveying belt 151, paper output roller 172, and paper output roller 173. Paper output tray 103 is disposed below paper output roller 172.

Double-side feeding unit 181 is detachably mounted in the back of the apparatus body 101. The double-side feed unit 181 takes in the paper 142 that is moved backward as the conveying belt 151 is rotated in the reverse direction, turns it over, and feeds it again between the counter roller 152 and the conveying belt 151. Manual feeder 182 is provided on the top surface of the double-side feed unit 181.

In this inkjet recording apparatus, the paper 142 is separated and fed from the paper feed part one by one. Being fed vertically, the paper 142 is guided by the guide 145 and conveyed between the conveying belt 151 and the counter roller 152. Then, it is guided by the conveying guide 153 at the leading end and is pressed against the conveying belt 151 by the leading end pressure roller 155 to change the convey direction substantially by 90°.

Meanwhile, the conveying belt 151 is charged by the charging roller 156, and the paper 142 is electrostatically adsorbed and conveyed by the conveying belt 151. Then, the recording heads 134 are driven according to image signals while the carriage 133 is moved. Ink droplets are ejected on the paused paper 142 for recording one-line. Then, the paper 142 is conveyed by a certain rate for recording the next line. Receiving a recording end signal or a signal indicating the rear end of the paper 142 has reached the recording area, the recording operation is terminated and the paper 142 is ejected to the paper output tray 103.

When it is detected that the remaining amount of the recording ink in the subtank 135 is nearly to the end, a certain amount of recording ink is supplied to the subtank 135 from the ink cartridge 200.

In this inkjet recording apparatus, when the recording ink in the ink cartridge 200 of the present invention is used up, the case of the ink cartridge 200 is disassembled and only the ink pouch contained therein can be exchanged. The ink cartridge 200 allows for stable recording ink supply even in a vertical and front mounting structure. Therefore, when the apparatus body 101 is installed with the top being blocked by something, for example, the ink cartridge 200 can be housed in a rack. Even if something is placed on the top surface of the apparatus body 101, the ink cartridge 200 can be easily replaced.

Here, the explanation is made with reference to an application in a serial type (shuttle type) inkjet recording apparatus in which the carriage scans is described. A line type inkjet recording apparatus having a line head is also applicable.

The inkjet recording apparatus and inkjet recording method of the present invention are applicable to various recording in an inkjet recording system. For example, the inkjet recording apparatus and inkjet recording method of the present invention can be particularly preferably applied to inkjet recording printers, facsimiles, copy machines, and printer/fax/copy complex machines.

An inkjet head to which the present invention is applied is described hereinafter.

Figure 6:
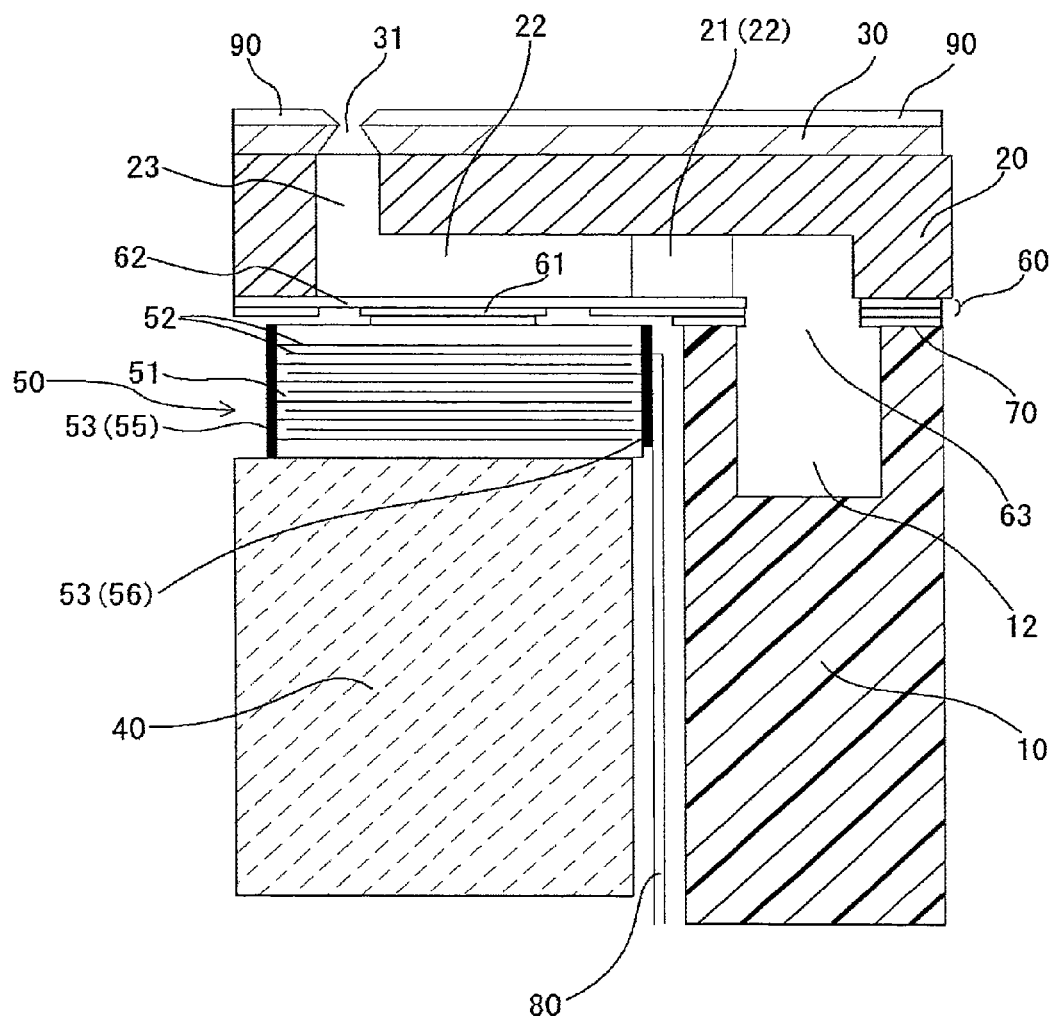
FIG. 6 shows an enlarged view of an example of an inkjet head suitable for use in the inkjet recording apparatus of the present invention.
Figure 7:
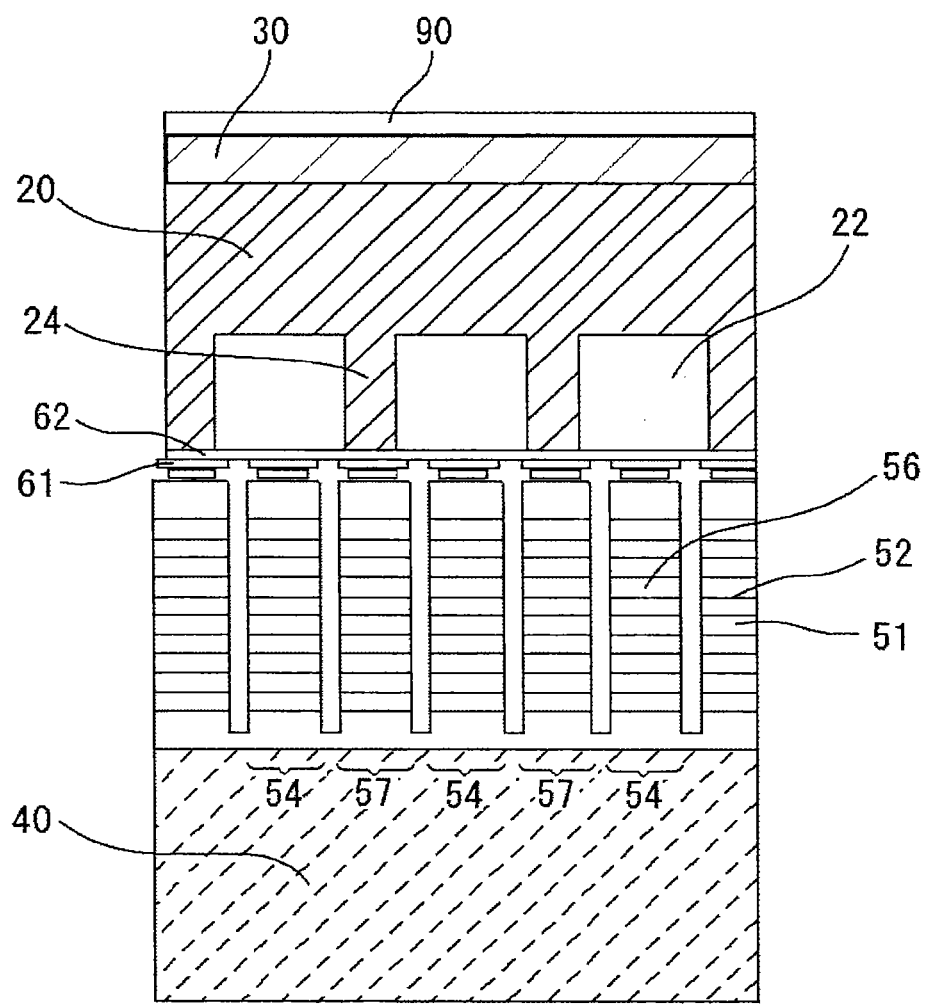
FIG. 7 shows an enlarged cross-sectional view of an example of an inkjet head suitable for use in the inkjet recording apparatus of the present invention.

FIG. 6 is an enlarged view of the core part of the inkjet head according to an embodiment of the present invention. FIG. 7 is an enlarged cross-sectional view of the core part of the same head in the inter-channel direction.

This inkjet head comprises frame 10 having cutouts serving as an ink supply port (not shown) and a common liquid chamber 1b, passage plate 20 having cutouts serving as fluid dragging part 2a and pressurized liquid chamber 2b and communication port 2c that communicates to nozzle 3a, diaphragm 60 having raised part 6a, diaphragm part 6b, and ink inflow port 6c, laminated piezoelectric element 50 connected to the diaphragm 60 via adhesive layer 70, and base 40 on which the laminated piezoelectric element 50 is fixed. The base 40 is made of barium titanate ceramics, on which two rows of laminated piezoelectric element 50 are arranged and connected.

The piezoelectric element 50 consists of alternately laminated piezoelectric layers of lead zirconate titanate (PZT) having a thickness of 10 μm to 50 μm per layer and internal electrode layers of silver palladium (AgPd) having a thickness of several μm per layer. The internal electrode layers 52 are connected to external electrodes 53 at both ends.

The laminated piezoelectric element 50 is divided into a comb-like shape by half-cut dicing, having driving parts and supporting parts (non-driving part) 57 every other division (see FIG. 7).

The exterior of one of the two external electrodes 53 (connecting a one end of the internal electrode layer in the surface or back side direction in the figure) is processed, for example notched, for limiting on length, thereby being divided by half-cut dicing. Multiple separate electrodes 54 are formed. Not divided by dicing, the other is conductive and serves as a common electrode 55.

A FPC (80) is soldered to the individual electrodes 54 of the driving part. The common electrode 55 is turned in an electrode layer provided at the end of the laminated piezoelectric layer and connected to the Gnd electrode of the FPC (80). An un-shown driver IC is mounted on the FPC (80) to control the application of driving voltage to the driving part 56.

As for the diaphragm 60, thin film diaphragm part 62, island-shaped raised part (island part) 61 formed at the center of the diaphragm part 62 and connected to the laminated piezoelectric element 50 serving as the driving p, a thick part including beams to be connected to the supporting part, and an opening serving as in ink inflow port 63 are formed by electroforming two nickel plated films. The diaphragm has a thickness of 3 μm and a width (one side) of 35 μm.

The connections between the island part 61 of the diaphragm 60 and the movable p of the laminated piezoelectric element 50 and between the diaphragm 60 and the frame 10 are made by patterning the adhesive layer 70 including a gap material.

The passage plate 20 is made of a silicon mono-crystalline substrate, in which cutouts serving as liquid dragging part 21 and pressurized liquid chamber 22 and a through-hole provided at the corresponding position to the nozzle 31 and serving as communication port 23 are patterned by etching.

The remaining part after the etching serves as a partition wall 24 of the pressurized liquid chamber 22. In this head, a part etched in a smaller width serves as the liquid dragging part 21.

The nozzle plate 30 is made of a metal material such as a nickel plated film formed by electroforming and has a number of nozzles 31 serving as fine ejection openings for discharging ink droplets. The nozzle 31 has a horn-like (substantially cylindrical or substantially truncated cone) internal shape (inner shape). The nozzle 31 has a diameter of approximately 20 μm to 35 μm at the ink droplets ejection side. The nozzle pitch in each row is 150 dpi.

The ink discharging surface (nozzle front side) of the nozzle plate 30 is provided with a water-repellent finish layer having a not shown water-repellent finish surface. A water-repellent finish film selected according to ink's physical properties such as PTFE-Ni eutectoid plating and electrodeposition of fluororesin, deposition of volatile fluororesin, silicone resin and fluororesin solvent application and baking can be provided to stabilize ink droplet shapes and ejection property and, thus, ensure a high image quality. Among them, for example many fluororesins are known; excellent water-repellency can be obtained by depositing modified perfluoropolyoxethane (by Daikin Industries, Ltd, trade name: Optool DSX) to a thickness of 30 Å to 100 Å.

The frame 10 in which cutouts serving as an ink supply inlet and a common liquid chamber 12 are formed is made by molding a resin.

In an inkjet head having the above structure, a driving waveform (10V to 50V pulse voltage) is applied to the driving part 56 according to recording signals. The driving part 56 is shifted in the lamination direction. The pressurized liquid chamber 22 is pressurized via the diaphragm 30 and the pressure is increased, thereby ink droplets are ejected from the nozzle 31.

After ejection of the ink droplets is completed, the ink pressure in the pressurized liquid chamber 22 is decreased. The inertia ink flow and driving pulse ejection process causes negative pressure within the pressurized liquid chamber 22, leading to the ink supply step. Meanwhile, the ink supplied from the ink tank enters the common liquid chamber 12 and further fills the pressurized liquid chamber 22 from the common liquid chamber 12 via the ink inflow port 63 and fluid dragging part 21.

The fluid dragging part 21 effectively attenuates residual pressure fluctuation while it stands against recharging (refilling) due to surface tension. Appropriately selected dragging part balances residual pressure attenuation with refilling time and shortens the transition time to the next ink droplets ejection operation (driving cycle).

EXAMPLES

The present invention is illustrated in detail with reference to examples given below, but these are not to be construed as limiting the present invention.

Preparation Example 1

-Preparation of Surface-Treated Carbon Black Pigment Dispersion-

To 3000 ml of 2.5 N defined sodium sulfate solution, there were added 90 g of carbon black having a CTAB surface area of 150 m$^2$/g, and DBP oil absorption of 100 ml/100 g, and the mixture was stirred at 300 rpm at 60° C. for 10 hours so as to allow the mixture react and process a oxidization treatment. The resulted reaction liquid was filtered, and the obtained carbon black from the filtration was neutralized by using sodium hydroxide, and then was subjected to ultrafiltration. Thus obtained carbon black was washed with water, sequentially dried, and then dispersed in pure water so as to be 20% by mass of the carbon black in the dispersion.

Preparation Example 2

-Preparation of Surface-Treated Yellow Pigment Dispersion-

C.I. Pigment Yellow 128 was subjected to a low temperature plasma treatment so as to prepare the pigment wherein a carboxylic acid group was introduced, as a yellow pigment. The thus obtained pigment was dispersed in ion-exchanged water, the dispersion was subjected to desalination condensation by using an ultrafiltration membrane, to thereby yield a yellow pigment dispersion having the pigment condensation of 15%.

Preparation Example 3

-Preparation of Surface-Treated Magenta Pigment Dispersion-

The surface-treated magenta pigment was prepared in the same manner as in Preparation Example 2, provided that C.I. Pigment Yellow 128 was replaced with C.I. Pigment Red 122. Similarly to the case of Preparation Example 2, the surface-treated pigment was easily dispersed in an aqueous medium at the time of stirring, and the dispersion was subjected to desalination condensation by using an ultrafiltration membrane, to thereby yield a magenta pigment dispersion having the pigment condensation of 15%.

Preparation Example 4

-Preparation of Surface-Treated Cyan Pigment Dispersion-

The surface-treated cyan pigment was prepared in the same manner as in Preparation Example 2, provided that C.I. Pigment Yellow 128 was replaced with C.I. Pigment Cyan 15:3. Similarly to the case of Preparation Example 2, the surface-treated pigment was easily dispersed in an aqueous medium at the time of stirring, and the dispersion was subjected to desalination condensation by using an ultrafiltration membrane, to thereby yield a cyan pigment dispersion having the pigment condensation of 15%.

Synthetic Example 1

-Preparation of Polymer Dispersion-

After sufficiently replacing an inner atmosphere of a 1 L flask equipped with a mechanical stirrer, a thermometer, a nitrogen gas inlet tube, a reflux tube and a dropping funnel with nitrogen gas, there were loaded 11.2 g of styrene, 2.8 g of acrylic acid, 1.20 g of lauryl methacrylate, 4.0 g of polyethylene glycolmethacrylate, 4.0 g of styrene macromer (a product name: AS-6, a manufacturer: Toagosei Co., Ltd.), and 0.4 g of mercaptoethanol, and the temperature was raised at 65° C. Separately, a mixture solution was prepared by mixing 100.8 g of styrene, 25.2 g of acrylic acid, 108.0 g of lauryl methacrylate, 36.0 g of polyethylene glycolmethacrylate, 60.0 g of hydroxyethyl methacrylate, 36.0 g of styrene micromer (a product name: AS-6, a manufacturer: Toagosei Co., Ltd.), 3.6 g of mercaptoethanol, 2.4 g of azobisdimethylvaleronitril, and 18.0 g of methylethylketone, and the mixture solution was dripped into the flask for 2.5 hours. After completing the dripping, a mixture solution consisting of 0.8 g of azobisdimethylvaleronitril and 18.0 g of methylethylketone was dripped into the flask for 0.5 hours. The mixture in the flask was matured at 65° C. for 1 hour. Thereafter, 0.8 g of azobisdimethylvaleronitril was added thereto, and the mixture was further matured for 1 hour. After completing the reaction, 364 g of methylethylketone was added in the flask to thereby yield 800 g of polymer solution having a condensation of 50%.

Preparation Example 5

-Preparation of Dispersion of Polymer Particles Containing a Phthalocyanine Pigment- After sufficiently mixing and stirring 28 g of the polymer solution obtained in Synthesis Example 1, 26 g of a phthalocyanine pigment, 13.6 g of 1 mol/L potassium hydroxide solution, 20 g of methylethylketone, and 30 g of ion-exchanged water, the mixture was kneaded by means of a three-roll mill. The thus obtained paste was added to 200 g of ion-exchanged water, and the mixture was sufficiently stirred. Thereafter, the mixture was treated with an evaporator so as to evaporate methylethylketone and water, to thereby obtained dispersion of polymer particles in the color of cyan.

Preparation Example 6

-Preparation of Dispersion of Polymer Particles Containing a Dimethyl Quinacridone Pigment- Dispersion of polymer particles in the color of magenta was prepared in the same manner as in Preparation Example 5, provided that the phthalocyanine pigment in Preparation Example 5 was replaced with C.I. Pigment Red 122.

Preparation Example 7

-Preparation of Dispersion of Polymer Particles Containing a Monoazo Yellow Pigment- Dispersion of polymer particles in the color of yellow was prepared in the same manner as in Preparation Example 5, provided that the phthalocyanine pigment in Preparation Example 5 was replaced with C.I. Pigment Yellow 74.

Preparation Example 8

-Preparation of Dispersion of Polymer Particles Containing a Carbon Black Pigment- Dispersion of polymer particles in the color of black was prepared in the same manner as in Preparation Example 5, provided that the phthalocyanine pigment in Preparation Example 5 was replaced with carbon black.

Preparation Example 9

-Preparation of Phthalocyanine Pigment Dispersion-

A mixture was obtained by mixing 150 g of C.I. Pigment Cyan 15:3, 110 g of a polyoxyethyleneβnaphtyleter pigment dispersant expressed by the following general formula 1 ($R^1$=1-20, L=10, n=40 in the formula), 2 g of PIONIN A-51-B (a manufacturer: Takemoto Oil & Fat Co., Ltd), and 738 g of distilled water. The thus obtained mixture was dispersed, and thereafter was further dispersed by means of a disc-type beads mill (a product type: KDL. a manufacturer: Shinmaru Enterprises Corporation, a medium for use: zirconia balls having a diameter of 0.3 mm) while circulating through the beads mill for 20 hours, to thereby obtained phthalocyanine pigment dispersion.

General formula 1

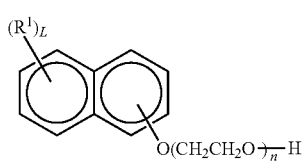

Preparation Example 10

-Preparation of Dimethyl Quinacridone Pigment Dispersion-

The dimethyl quinacridone pigment dispersion was prepared in the same manner as in Preparation Example 9, provided that C.I. Pigment Cyan 15:3 was replaced with C.I. Pigment Red 122.

Preparation of Monoazo Yellow Pigment Dispersion

The monoazo yellow pigment dispersion was prepared in the same manner as in Preparation Example 9, provided that C.I. Pigment Cyan 15:3 was replaced with C.I. Pigment Yellow 74.

Hereinafter, synthetic examples of acryl-silicones resin emulsion as examples of the water-dispersible resin suitably used in the present invention.

Synthetic Example 2

-Synthesis 1 of Particles- Made of Acrylic Resin Modified with Silicone which does not Include a Reactive Sylil Group- After sufficiently replacing an inner atmosphere of a 1 L flask equipped with a mechanical stirrer, a thermometer, a nitrogen gas inlet tube, a reflux tube and a dropping funnel with nitrogen gas, there were loaded 10 g of AQUARON RN-20 manufactured by Dai-ichi Kogyo Seiyaku Co., Ltd., 10 g of potassium persulfite and 286 g of pure water, and the temperature was raised at 65° C. Separately, a mixture solution was prepared by mixing 150 g of methyl methacrylate, 100 g of 2-ethylhexyl acrylate, 20 g of acrylic acid, 20 g of vinyltriethoxy silane, 10 g of AQUARON RN-20 manufactured by Dai-ichi Kogyo Seiyaku Co., Ltd., 4 g of potassium persulfite, and 398.3 g of pure water, and the mixture solution was dripped into the flask for 2.5 hours. The mixture in the flask was heated to mature at 80° C. for 3 hour, and then cooled. Thereafter, the pH value of the mixture was controlled to be ranging from 7 to 8 by using potassium hydroxide. The thus obtained particles were subjected to the measurement by means of MICROTTAC UPA manufactured by Nikkiso Co., Ltd., and it was found out that the average particle diameter thereof was 130 nm. In addition, a minimum temperature for film formation was 0° C.

Synthesis Example 3

-Synthesis 2 of Particles- Made of Acrylic Resin Modified with Silicone which does not Include a Reactive Sylil Group- After sufficiently replacing an inner atmosphere of a 1 L flask equipped with a mechanical stirrer, a thermometer, a nitrogen gas inlet tube, a reflux tube and a dropping funnel with nitrogen gas, there were loaded 10 g of AQUARON RN-20 manufactured by Dai-ichi Kogyo Seiyaku Co., Ltd., 10 g of potassium persulfite and 286 g of pure water, and the temperature was raised at 65° C. Separately, a mixture solution was prepared by mixing 150 g of methyl methacrylate, 100 g of 2-ethylhexyl acrylate, 20 g of acrylic acid, 40 g of hexyltrimethoxy silane, 10 g of AQUARON RN-20 manufactured by Dai-ichi Kogyo Seiyaku Co., Ltd., 4 g of potassium persulfite, and 398.3 g of pure water, and the mixture solution was dripped into the flask for 3 hours. The mixture in the flask was heated to mature at 80° C. for 3 hour, and then cooled. Thereafter, the pH value of the mixture was controlled to be ranging from 7 to 8 by using potassium hydroxide. The thus obtained particles were subjected to the measurement by means of MICROTTAC UPA manufactured by Nikkiso Co., Ltd., and it was found out that the average particle diameter thereof was 148 nm. In addition, a minimum temperature for film formation was 0° C.

Synthesis Example 4

Synthesis of Particles- Made of Acrylic Resin Modified with Silicone Containing a Reactive Sylil Group- The synthesis of a reactive sylil group containing silicone modified acrylic resin particles was carried out in accordance with the method described in Examples of JP-A 1994-157861.

After sufficiently replacing an inner atmosphere of a 1 L flask equipped with a mechanical stirrer, a thermometer, a nitrogen gas inlet tube, a reflux tube and a dropping funnel with nitrogen gas, there were loaded 100 g of pure water, 3 g of sodium dodecylbenzene sulfonate and 1 g of polyethylene glycol nonylphenylether, further added with 1 g of ammonium persulfite and 0.2 g of sodium hydrogen persulfite, and the temperature was raised at 60° C. Separately, a mixture solution was prepared by mixing 30 g of butyl acrylate, 40 g of methyl methacrylate, 19 g of butyl methacrylate, 10 g of potassium salt of vinylsilane triol, and 1 g of 3-methacryloxypropylmethyldimethoxysilane, and the mixture solution was dripped into the flask for 3 hours. Thereafter, the pH value of the mixture was controlled to be 7 by using ammonium solution. The thus obtained particles were subjected to the measurement by means of MICROTTAC UPA manufactured by Nikkiso Co., Ltd., and it was found out that the average particle diameter thereof was 160 nm.

Ink solutions were prepared in accordance with the following formulae, and were controlled their pH value to be 9 by using 10% by mass lithium hydroxide aqueous solution. Thereafter, each solution was filtered with a membrane having an average pore diameter of 0.8 μm, to thereby obtain each ink.

Production Example A-1

-Black Ink A-1-

| | |
|---|---|
| carbon black of Preparation Example 1 | 8% by mass (solids content) |
| acryl-silicone resin emulsion of Synthesis Example 2 | 4% by mass (solids content) |
| diethylene glycol | 18% by mass |
| glycerin | 6% by mass |
| 2-pyrrolidone | 2% by mass |
| a compound expressed by the following formula | 1% by mass |
| 2,2,4-trimethyl-1,3-pentanediol | 2% by mass |
| ion-exchanged water | balance |
| total | 100% by mass |

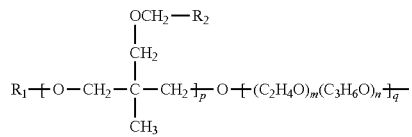

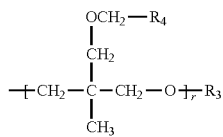

In the formula above, each of $R_1$, $R_2$, $R_3$, and $R_4$ denotes $CF_3$, each of p and r denotes 4, q denotes 1, and each of m and n denotes 10.

Production Example A-2

-Yellow Ink A-1-

| | |
|---|---|
| yellow pigment dispersion of Preparation Example 2 | 5% by mass (solids content) |
| acryl-silicone resin emulsion of Synthesis Example 1 | 10% by mass (solids content) |
| 1,3-butanediol | 20% by mass |
| glycerin | 8% by mass |
| 2-pyrrolidone | 2% by mass |
| a compound expressed by the following formula | 1% by mass |
| 2,2,4-trimethyl-1,3-pentanediol | 2% by mass |
| ion-exchanged water | balance |
| total | 100% by mass |

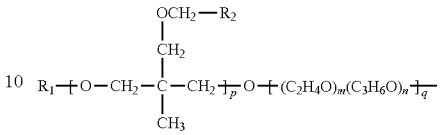

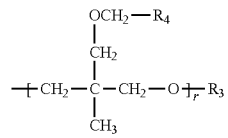

In the formula above, each of $R_1$, $R_2$, $R_3$, and $R_4$ denotes $CF_3$, each of p and r denotes 4, q denotes 1, and each m and n denotes 10.

Production Example A-3

-Magenta Ink A-1-

| | |
|---|---|
| magenta pigment dispersion of Preparation Example 3 | 5% by mass (solids content) |
| acryl-silicone resin emulsion of Synthesis Example 3 | 15% by mass (solids content) |
| triethyleneglycol isobutylether | 4% by mass |
| glycerin | 15% by mass |
| a compound expressed by the following formula | 2% by mass |
| 2-ethyl-1,3-hexanediol | 2% by mass |
| ion-exchanged water | balance |
| total | 100% by mass |

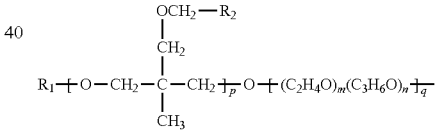

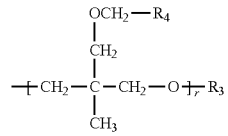

In the formula above, each of $R_1$ and $R_3$ denotes H, each of $R_2$ and $R_4$ denotes $CF_3$, each of p and r denotes 4, q denotes 1, m denotes 21, and n is 0.

Production Example A-4

-Cyan Ink A-1-

| | |
|---|---|
| cyan pigment dispersion of Preparation Example 4 | 5% by mass (solids content) |
| acryl-silicone resin emulsion of Synthesis Example 4 | 15% by mass (solids content) |
| 3-methyl-1,3-butanediol | 15% by mass |
| glycerin | 15% by mass |

| | |
|---|---|
| a compound expressed by the following formula | 2% by mass |
| 2-ethyl-1,3-hexane diol | 2% by mass |
| ion-exchanged water | balance |
| total | 100% by mass |

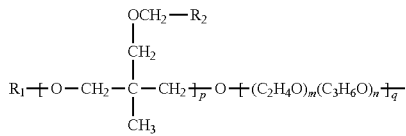

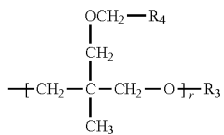

In the formula above, each of $R_1$ and $R_3$ denotes H, each of $R_2$ and $R_4$ denotes $CF_3$, each of p and r denotes 4, q denotes 1, m denotes 21, and n is 0.

Production Example A-5

-Cyan Ink A-2-

| | |
|---|---|
| cyan pigment dispersion of Preparation Example 5 | 5% by mass (solids content) |
| urethane resin emulsion W-5025 (a manufacturer: Mitui Takeda Chemicals Inc.) | 10% by mass (solids content) |
| 1,6-hexane diol | 20% by mass |
| glycerin | 8% by mass |
| a compound expressed by the following formula | 0.5% by mass |
| a fluorine containing surfactant, ZONYL FS-300 (a manufacturer: Dupont Japan Limited) | 0.3% by mass |
| 2-ethyl-1,3-hexane diol | 2% by mass |
| ion-exchanged water | balance |
| total | 100% by mass |

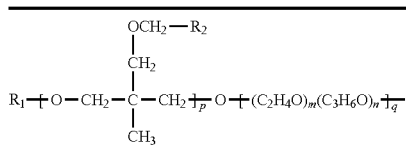

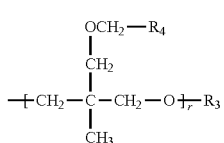

In the formula above, each of $R_1$, $R_2$, $R_3$, and $R_4$ denotes $CF_3$, each of p and r denotes 4, q denotes 1, and each of m and n denotes 10.

Production Example A-6

-Magenta Ink A-2-

| | |
|---|---|
| magenta pigment dispersion of Preparation Example 6 | 5% by mass (solids content) |
| urethane resin emulsion W-5661 (a manufacturer: Mitui Takeda Chemicals Inc.) | 10% by mass (solids content) |
| dipropylene glycol | 15% by mass |
| glycerin | 15% by mass |

| | |
|---|---|
| a compound expressed by the following formula | 1% by mass |
| 2-ethyl-1,3-hexane diol | 2% by mass |
| ion-exchanged water | balance |
| total | 100% by mass |

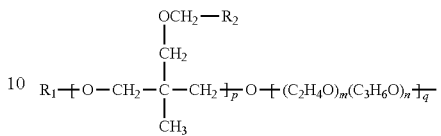

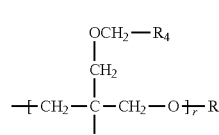

In the formula above, each of $R_1$, $R_2$, $R_3$, and $R_4$ denotes $CF_3$, each of p and r denotes 4, q denotes 1, and each of m and n denotes 10.

Production Example A-7

-Yellow Ink A-2-

| | |
|---|---|
| yellow pigment dispersion of Preparation Example 7 | 4% by mass (solids content) |
| acryl-silicone resin emulsion of Synthesis Example 3 | 15% by mass (solids content) |
| 2-methyl-2,4-pentane diol | 10% by mass |
| glycerin | 10% by mass |
| a compound expressed by the following formula | 1% by mass |
| 2,2,4-trimethyl-1,3-pentanediol | 3% by mass |
| ion-exchanged water | balance |
| total | 100% by mass |

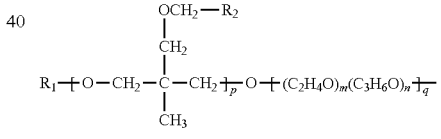

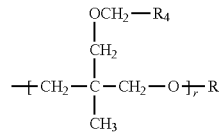

In the formula above, each of $R_1$, $R_2$, $R_3$, and $R_4$ denotes $CF_3$, each of p and r denotes 4, q denotes 1, and each of m and n denotes 10.

Production Example A-8

-Black Ink A-2-

| | |
|---|---|
| black pigment dispersion of Preparation Example 8 | 8% by mass (solids content) |
| acryl-silicone resin emulsion of Synthesis Example 2 | 12% by mass (solids content) |
| 1,6-hexane diol | 20% by mass |
| glycerin | 8% by mass |

| | |
|---|---|
| a compound expressed by the following formula | 1% by mass |
| 2-ethyl-1,3-hexane diol | 2% by mass |
| ion-exchanged water | balance |
| total | 100% by mass |

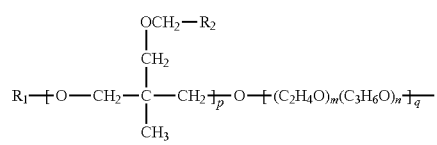

In the formula above, each of $R_1$ and $R_3$ denotes H, each of $R_2$ and $R_4$ denotes $CF_3$, each of p and r denotes 4, q denotes 1, m denotes 21, and n is 0.

Production Example A-9

-Cyan Ink A-3-

| | |
|---|---|
| cyan pigment dispersion of Preparation Example 9 | 4% by mass (solids content) |
| urethane resin emulsion W-5025 (a manufacturer: Mitui Takeda Chemicals Inc.) | 10% by mass (solids content) |
| 1,3-butane diol | 20% by mass |
| glycerin | 8% by mass |
| a compound expressed by the following formula | 1.5% by mass |
| 2-ethyl-1,3-hexane diol | 2% by mass |
| ion-exchanged water | balance |
| total | 100% by mass |

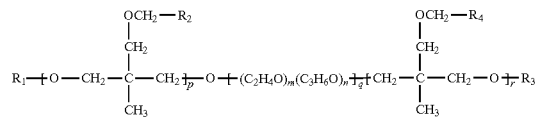

In the formula above, each of $R_1$ and $R_3$ denotes H, each of $R_2$ and $R_4$ denotes $CF_3$, each of p and r denotes 4, q denotes 1, m denotes 21, and n is 0.

Production Example A-10

-Magenta Ink A-3-

| | |
|---|---|
| magenta pigment dispersion of Preparation Example 6 | 7% by mass (solids content) |
| urethane resin emulsion W-5661 (a manufacturer: Mitui Takeda Chemicals Inc.) | 10% by mass (solids content) |
| 1,5-pentane diol | 15% by mass |
| glycerin | 15% by mass |
| a compound expressed by the following formula | 1% by mass |
| 2-ethyl-1,3-hexane diol | 2% by mass |
| ion-exchanged water | balance |
| total | 100% by mass |

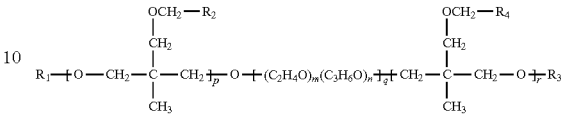

In the formula above, each of $R_1$, $R_2$, $R_3$, and $R_4$ denotes $CF_3$, each of p and r denotes 4, q denotes 1, and each of m and n denotes 10.

Production Example A-11

-Yellow Ink A-3-

| | |
|---|---|
| yellow pigment dispersion of Preparation Example 7 | 6% by mass (solids content) |
| acryl-silicone resin emulsion of Synthesis Example 3 | 15% by mass (solids content) |
| 2-methyl-2,4-pentane diol | 10% by mass |
| glycerin | 10% by mass |
| a compound expressed by the following formula | 1% by mass |
| 2,2,4-trimethyl-1,3-pentane diol | 3% by mass |
| ion-exchanged water | balance |
| total | 100% by mass |

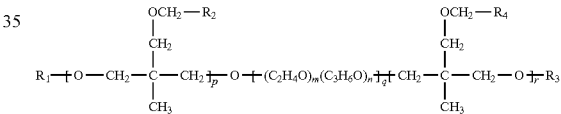

In the formula above, each of $R_1$, $R_2$, $R_3$, and $R_4$ denotes $CF_3$, each of p and r denotes 4, q denotes 1, and each of m and n denote 10.

Comparative Production Example A-1

-Comparative Cyan Pigment Ink A-1-

A cyan ink was obtained in the same manner as in Production Example A-5, provided that W-5025 was not added here.

Comparative Production Example A-2

-Comparative Magenta Pigment Ink-

A magenta ink was obtained in the same manner as in Production Example A-6, provided that W-5661 was not added here.

Comparative Production Example A-3

-Comparative Yellow Ink-

A yellow ink was obtained in the same manner as in Production Example A-7, provided that the acryl-silicone resin emulsion of Synthesis Example 3 was not added here.

Comparative Production Example A-4

-Comparative Black Pigment Ink-

A black ink was obtained in the same manner as in Production Example A-8, provided that the acryl-silicone resin emulsion of Synthesis Example 2 was not added here, and the compound expressed by the formula above was replaced with a surfactant, F470 manufactured by Dainippon Ink and Chemicals, Inc.

Comparative Production Examples A-5 to A-8

-Preparation of Dye Inks-

After mixing and sufficiently stirring the following substances so as to dissolve, the mixture was subjected to the pressure filtration by using a porous fluoro-filter manufactured by Sumitomo Electric Industries, Ltd., to thereby prepare a dye ink set.

Compositions of Dye Inks:

(Type of Dye)

| | | |
|---|---|---|
| Comparative Production Example A-5: | yellow | C.I. Direct Yellow 86 |
| Comparative Production Example A-6: | cyan | C.I. Direct Blue 199 |
| Comparative Production Example A-7: | magenta | C.I. Acid Red 285 |
| Comparative Production Example A-8: | black | C.I. Direct Black 154 |

(Formula of Ink)

| | |
|---|---|
| each dye listed above | 4% by mass |
| glycerin | 7% by mass |
| thiodiglycol | 7% by mass |
| urea | 7% by mass |
| a surfactant, F470 (a manufacturer: Dainippon Ink and Chemicals Inc.) | 1% by mass |
| ion-exchanged water | balance |
| total | 100% by mass |

The composition of each ink in Production Examples and Comparative Production Examples was shown in Table 1A.

In Table 1A, a surface tension, viscosity, a mass ratio A/B of the coloring agent B to the water-dispersible resin A, of each ink are presented.

Note that, the viscosity of each ink was measured by means of R-type viscometer (a manufacturer: Toki Sangyo Co., Ltd.) at 25° C.

TABLE 1A

| Production Example | Ink | Surface tension (mN/m) | Viscosity (mPa·s) | A/B |
|---|---|---|---|---|
| Ex. A-1 | black ink A-1 | 24.6 | 8.85 | 0.5 |
| Ex. A-2 | yellow ink A-1 | 25.5 | 9.50 | 2.0 |
| Ex. A-3 | magenta ink A-1 | 26.6 | 8.41 | 3.0 |
| Ex. A-4 | cyan ink A-1 | 26.4 | 9.32 | 3.0 |
| Ex. A-5 | cyain ink A-2 | 28.8 | 8.00 | 2.0 |
| Ex. A-6 | magenta ink A-2 | 28.6 | 8.52 | 2.0 |
| Ex. A-7 | yellow ink A-2 | 23.4 | 8.71 | 3.75 |
| Ex. A-8 | black ink A-2 | 28.6 | 9.22 | 1.5 |
| Ex. A-9 | cyan ink A-3 | 26.1 | 7.39 | 2.5 |
| Ex. A-10 | magenta ink A-3 | 28.5 | 8.89 | 1.73 |
| Ex. A-11 | yellow ink A-3 | 24.0 | 9.59 | 2.5 |
| Com. Ex. A-1 | pig. cyan A-1 | 28.2 | 5.87 | 0 |
| Com. Ex. A-2 | pig. magenta A-1 | 28.0 | 6.32 | 0 |
| Com. Ex. A-3 | pig. yellow A-1 | 21.6 | 5.80 | 0 |
| Com. Ex. A-4 | pig. black A-1 | 27.9 | 6.77 | 0 |
| Com. Ex. A-5 | dye yellow A-1 | 23.4 | 3.24 | 0 |
| Com. Ex. A-6 | dye cyan A-1 | 23.4 | 3.28 | 0 |
| Com. Ex. A-7 | dye magenta A-1 | 23.7 | 3.33 | 0 |
| Com. Ex. A-8 | dye black A-1 | 23.2 | 3.25 | 0 |

Flowingly, ink sets of Examples and Comparative Examples are shown in Table 2A.

TABLE 2A

| | Ink Set | Black Ink | Cyan Ink | Magenta Ink | Yellow Ink |
|---|---|---|---|---|---|
| Ex. 1 | ink set A-1 | Pro. Ex. 1 | Pro. Ex. 4 | Pro. Ex. 3 | Pro. Ex. 2 |
| Ex. 2 | ink set A-2 | Pro. Ex. 8 | Pro. Ex. 5 | Pro. Ex. 6 | Pro. Ex. 7 |
| Ex. 3 | ink set A-3 | Pro. Ex. 1 | Pro. Ex. 9 | Pro. Ex. 10 | Pro. Ex. 11 |
| Ex. 4 | ink set A-4 | Pro. Ex. 8 | Pro. Ex. 9 | Pro. Ex. 6 | Pro. Ex. 2 |
| Ex. 5 | ink set A-5 | Pro. Ex. 8 | Pro. Ex. 4 | Pro. Ex. 3 | Pro. Ex. 7 |
| Com. Ex. 1 | Com. set A-1 | Com. Ex. 4 | Com. Ex. 1 | Com. Ex. 2 | Com. Ex. 3 |
| Com. Ex. 2 | Com. set A-2 | Com. Ex. 8 | Com. Ex. 6 | Com. Ex. 7 | Com. Ex. 5 |

Ink solutions were prepared in accordance with the following formulae, and were controlled their pH value to be 9 by using 10% by mass lithium hydroxide aqueous solution. Thereafter, each solution was filtered with a membrane having an average pore diameter of 0.8 μm, to thereby obtain each ink.

Production Example B-1

-Black Ink B-1-

| | |
|---|---|
| carbon black of Preparation Example 1 | 5% by mass (solids content) |
| dipeptide (alanyl glutamine) | 3% by mass |

-continued

| | |
|---|---|
| acryl-silicone resin emulsion of Synthesis Example 2 | 4% by mass (solids content) |
| diethylene glycol | 10% by mass |
| glycerin | 20% by mass |
| 2-pyrrolidone | 2% by mass |
| a compound expressed by the following formula | 1% by mass |
| 2,2,4-trimethyl-1,3-pentanediol | 2% by mass |
| ion-exchanged water | balance |
| total | 100% by mass |

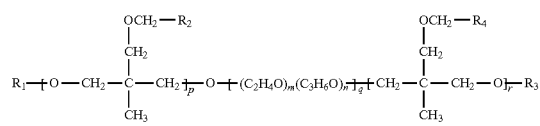

In the formula above, each of $R_1$, $R_2$, $R_3$, and $R_4$ denotes $CF_3$, each of p and r denotes 4, q denotes 1, and each of m and n denotes 10.

Production Example B-2

-Yellow Ink B-1-

| | |
|---|---|
| yellow pigment dispersion of Preparation Example 2 | 4.5% by mass (solids content) |
| dipeptide (alanyl glutamine) | 10% by mass |
| acryl-silicone resin emulsion of Synthesis Example 1 | 10% by mass (solids content) |
| 1,3-butanediol | 10% by mass |
| glycerin | 20% by mass |
| 2-pyrrolidone | 2% by mass |
| a compound expressed by the following formula | 1% by mass |
| 2,2,4-trimethyl-1,3-pentanediol | 2% by mass |
| ion-exchanged water | balance |
| total | 100% by mass |

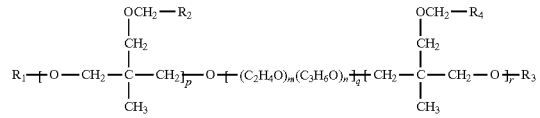

In the formula above, each of $R_1$, $R_2$, $R_3$, and $R_4$ denotes $CF_3$, each of p and r denotes 4, q denotes 1, and each of m and n denotes 10.

Production Example B-3

-Magenta Ink B-1-

| | |
|---|---|
| magenta pigment dispersion of Preparation Example 3 | 5% by mass (solids content) |
| dipeptide (bisalanyl cystein) | 10% by mass |
| acryl-silicone resin emulsion of Synthesis Example 3 | 12% by mass (solids content) |
| triethyleneglycol isobutylether | 4% by mass |
| glycerin | 25% by mass |
| a compound expressed by the following formula | 2% by mass |
| 2-ethyl-1,3-hexane diol | 2% by mass |
| ion-exchanged water | balance |
| total | 100% by mass |

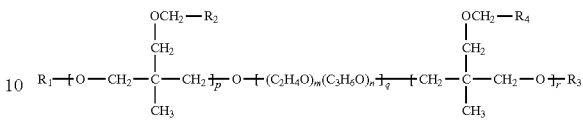

In the formula above, each of $R_1$ and $R_3$ denotes H, each of $R_2$ and $R_4$ denotes $CF_3$, each of p and r denotes 4, q denotes 1, m denotes 21, and n is 0.

Production Example B-4

-Cyan Ink B-1-

| | |
|---|---|
| cyan pigment dispersion of Preparation Example 4 | 4% by mass (solids content) |
| dipeptide (alanyl glutamine) | 18% by mass |
| acryl-silicone resin emulsion of Synthesis Example 4 | 15% by mass (solids content) |
| 3-methyl-1,3-butanediol | 10% by mass |
| glycerin | 20% by mass |
| a compound expressed by the following formula | 2% by mass |
| 2-ethyl-1,3-hexane diol | 2% by mass |
| ion-exchanged water | balance |
| total | 100% by mass |

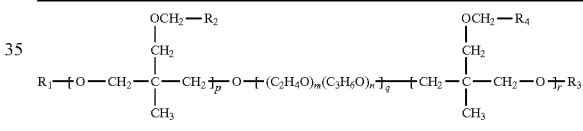

In the formula above, each of $R_1$ and $R_3$ denotes H, each of $R_2$ and $R_4$ denotes $CF_3$, each of p and r denotes 4, q denotes 1, m denotes 21, and n is 0.

Production Example B-5

-Cyan Ink B-2-

| | |
|---|---|
| cyan pigment dispersion of Preparation Example 5 | 3.5% by mass (solids content) |
| dipeptide (alanyl glutamine) | 18% by mass |
| urethane resin emulsion W-5025 (a manufacturer: Mitui Takeda Chemicals Inc.) | 10% by mass (solids content) |
| 1,6-hexane diol | 10% by mass |
| glycerin | 20% by mass |
| a compound expressed by the following formula | 0.5% by mass |
| a fluorine containing surfactant, ZONYL FS-300 (a manufacturer: Dupont Japan Limited) | 0.3% by mass |
| 2-ethyl-1,3-hexane diol | 2% by mass |
| ion-exchanged water | balance |
| total | 100% by mass |

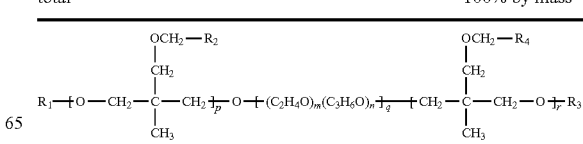

In the formula above, each of $R_1$, $R_2$, $R_3$, and $R_4$ denotes $CF_3$, each of p and r denotes 4, q denotes 1, and each of m and n denotes 10.

Production Example B-6

-Magenta Ink B-2-

| | |
|---|---|
| magenta pigment dispersion of Preparation Example 6 | 4.5% by mass (solids content) |
| dipeptide (alanyl glutamine) | 18% by mass |
| urethane resin emulsion W-5661 | 10% by mass |
| (a manufacturer: Mitui Takeda Chemicals Inc.) | (solids content) |
| dipropylene glycol | 15% by mass |
| glycerin | 25% by mass |
| a compound expressed by the following formula | 1% by mass |
| 2-ethyl-1,3-hexane diol | 2% by mass |
| ion-exchanged water | balance |
| total | 100% by mass |

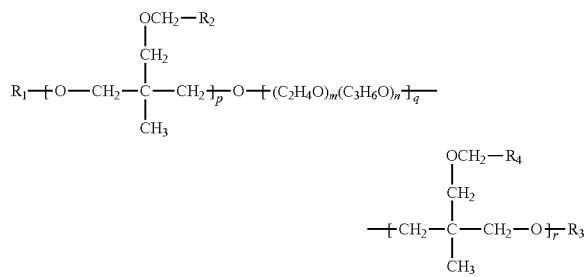

In the formula above, each of $R_1$, $R_2$, $R_3$, and $R_4$ denotes $CF_3$, each of p and r denotes 4, q denotes 1, and each of m and n denotes 10.

Production Example B-7

-Yellow Ink B-2-

| | |
|---|---|
| yellow pigment dispersion of Preparation Example 7 | 3.5% by mass (solids content) |
| dipaptide (alanyl glutamine) | 10% by mass |
| acryl-silicone resin emulsion of Synthesis Example 3 | 15% by mass (solids content) |
| 2-methyl-2,4-pentane diol | 10% by mass |
| glycerin | 25% by mass |
| a compound expressed by the following formula | 1% by mass |
| 2,2,4-trimethyl-1,3-pentanediol | 3% by mass |
| ion-exchanged water | balance |
| total | 100% by mass |

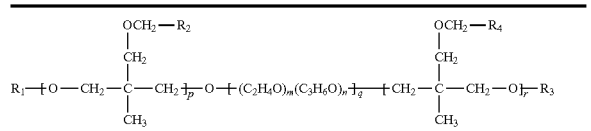

In the formula above, each of $R_1$, $R_2$, $R_3$, and $R_4$ denotes $CF_3$, each of p and r denotes 4, q denotes 1, and each of m and n denotes 10.

Production Example B-8

-Black Ink B-2-

| | |
|---|---|
| black pigment dispersion of Preparation Example 8 | 6.5% by mass (solids content) |
| dipeptide (alanyl glutamine) | 18% by mass |
| acryl-silicone resin emulsion of Synthesis Example 2 | 12% by mass (solids content) |
| 1,6-hexane diol | 15% by mass |
| glycerin | 20% by mass |
| a compound expressed by the following formula | 1% by mass |
| 2-ethyl-1,3-hexane diol | 2% by mass |
| ion-exchanged water | balance |
| total | 100% by mass |

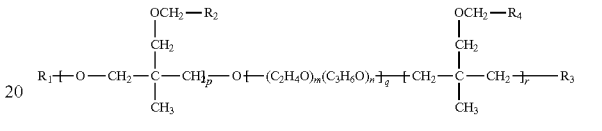

In the formula above, each of $R_1$ and $R_3$ denotes H, each of $R_2$ and $R_4$ denotes $CF_3$, each of p and r denotes 4, q denotes 1, m denotes 21, and n is 0.

Production Example B-9

-Cyan Ink B-3-

| | |
|---|---|
| cyan pigment dispersion of Preparation Example 9 | 4% by mass (solids content) |
| dipeptide (bisglycyl glutamine) | 8% by mass |
| urethane resin emulsion W-5025 | 10% by mass |
| (a manufacturer: Mitui Takeda Chemicals Inc.) | (solids content) |
| 1,3-butane diol | 10% by mass |
| glycerin | 20% by mass |
| a compound expressed by the following formula | 1.5% by mass |
| 2-ethyl-1,3-hexane diol | 2% by mass |
| ion-exchanged water | balance |
| total | 100% by mass |

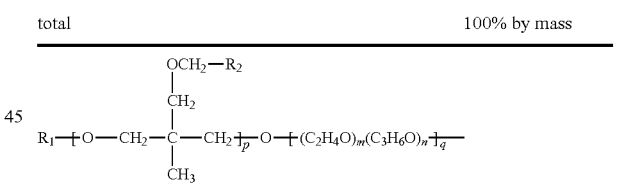

In the formula above, each of $R_1$ and $R_3$ denotes H, each of $R_2$ and $R_4$ denotes $CF_3$, each of p and r denotes 4, q denotes 1, m denotes 21, and n is 0.

Production Example B-10

-Magenta Ink B-3-

| | |
|---|---|
| magenta pigment dispersion of Preparation Example 6 | 7% by mass (solids content) |
| dipeptide (alanyl glutamine) | 15% by mass |

-continued

| | |
|---|---|
| urethane resin emulsion W-5661 (a manufacturer: Mitui Takeda Chemicals Inc.) | 10% by mass (solids content) |
| 1,5-pentane diol | 15% by mass |
| glycerin | 25% by mass |
| a compound expressed by the following formula | 1% by mass |
| 2-ethyl-1,3-hexane diol | 2% by mass |
| ion-exchanged water | balance |
| total | 100% by mass |

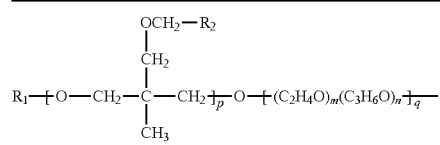

In the formula above, each of $R_1$, $R_2$, $R_3$, and $R_4$ denotes $CF_3$, each of p and r denotes 4, q denotes 1, and each of m and n denotes 10.

Production Example B-11

-Yellow Ink B-3-

| | |
|---|---|
| yellow pigment dispersion of Preparation Example 7 | 6% by mass (solids content) |
| dipeptide (glycyl glutamine) | 8% by mass |
| acryl-silicone resin emulsion of Synthesis Example 3 | 15% by mass (solids content) |
| 2-methyl-2,4-pentane diol | 8% by mass |
| glycerin | 20% by mass |
| a compound expressed by the following formula | 1% by mass |
| 2,2,4-trimethyl-1,3-pentane diol | 3% by mass |
| ion-exchanged water | balance |
| total | 100% by mass |

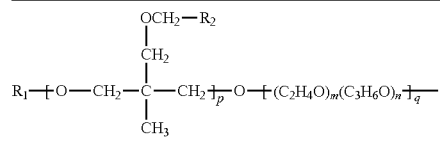

In the formula above, each of $R_1$, $R_2$, $R_3$, and $R_4$ denotes $CF_3$, each of p and r denotes 4, q denotes 1, and each of m and n denotes 10.

Comparative Production Example B-1

-Comparative Cyan Pigment Ink B-1-

A cyan ink was obtained in the same manner as in Production Example B-5, provided that dipeptide (alanyl glutamine) was not added here.

Comparative Production Example B-2

-Comparative Magenta Pigment Ink B-1-

A magenta ink was obtained in the same manner as in Production Example B-6, provided that dipeptide (alanyl glutamine) was not added here.

Comparative Production Example B-3

-Comparative Yellow Ink B-1-

A yellow ink was obtained in the same manner as in Production Example B-7, provided that dipeptide (alanyl glutamine) was not added here.

Comparative Production Example B-4

-Comparative Black Pigment Ink B-1-

A black ink was obtained in the same manner as in Production Example B-8, provided that dipeptide (alanyl glutamine) was not added here.

Comparative Production Examples B-5 to B-8

-Preparation of Dye Inks-

After mixing and sufficiently stirring the following substances so as to dissolve, the mixture was subjected to the pressure filtration by using a porous fluoro-filter manufactured by Sumitomo Electric Industries, Ltd., to thereby prepare a dye ink set.

Compositions of Dye Inks:

(Type of Dye)

| | | |
|---|---|---|
| Comparative Production Example B-5: | yellow | C.I. Direct Yellow 86 |
| Comparative Production Example B-6: | cyan | C.I. Direct Blue 199 |
| Comparative Production Example B-7: | magenta | C.I. Acid Red 285 |
| Comparative Production Example B-8: | black | C.I. Direct Black 154 |

(Formula of Ink)

| | |
|---|---|
| each dye listed above | 4% by mass |
| glycerin | 7% by mass |
| thiodiglycol | 7% by mass |
| urea | 7% by mass |
| a surfactant, F470 (a manufacturer: Dainippon Ink and Chemicals Inc.) | 1% by mass |
| ion-exchanged water | balance |
| total | 100% by mass |

Comparative Production Example B-9

An ink was obtained in the same manner as in Production Example B-1, provided that dipeptide was replaced with 5% by mass of urea.

Comparative Production Example B-10

An ink was obtained in the same manner as in Production Example B-2, provided that dipeptide was replaced with 5% by mass of urea.

Comparative Production Example B-11

An ink was obtained in the same manner as in Production Example B-3, provided that dipeptide was replaced with 5% by mass of urea.

Comparative Production Example B-12

An ink was obtained in the same manner as in Production Example B-4, provided that dipeptide was replaced with 5% by mass of urea.

The compositions of each ink in Production Examples and Comparative Production Examples were shown in Table 1B.

In Table 1B, a surface tension of the ink, viscosity of the ink, a solids mass of dipeptide (% by mass) in the ink are presented.

Note that, the viscosity of each ink was measured by means of R-type viscometer (a manufacturer: Toki Sangyo Co., Ltd.) at 25° C.

TABLE 1B

| Preparation Example | Ink | Surface tension (mN/m) | Viscosity (mPa·s) | dipeptide solids mass (% by mass) |
| --- | --- | --- | --- | --- |
| Ex. B-1 | black ink B-1 | 26.8 | 9.2 | 3.0 |
| Ex. B-2 | yellow ink B-1 | 26.2 | 9.74 | 10.0 |
| Ex. B-3 | magenta ink B-1 | 27.6 | 9.41 | 10.0 |
| Ex. B-4 | cyan ink B-1 | 26.9 | 10.02 | 18.0 |
| Ex. B-5 | cyain ink B-2 | 25.2 | 9.78 | 18.0 |
| Ex. B-6 | magenta ink B-2 | 28.4 | 11.52 | 18.0 |
| Ex. B-7 | yellow ink B-2 | 26.5 | 8.91 | 10.0 |
| Ex. B-8 | black ink B-2 | 28.6 | 9.64 | 18.0 |
| Ex. B-9 | cyan ink B-3 | 27.1 | 7.87 | 8.0 |
| Ex. B-10 | magenta ink B-3 | 28.8 | 9.89 | 15.0 |
| Ex. B-11 | yellow ink B-3 | 26.2 | 9.79 | 8.0 |
| Com. Ex. B-1 | pig. cyan B-1 | 25.0 | 6.87 | 0 |
| Com. Ex. B-2 | pig. magenta B-1 | 28.1 | 9.38 | 0 |
| Com. Ex. A-3 | pig. yellow B-1 | 26.2 | 7.80 | 0 |
| Com. Ex. B-4 | pig. black B-1 | 28.4 | 7.79 | 0 |
| Com. Ex. B-5 | dye yellow B-1 | 23.4 | 3.24 | 0 |
| Com. Ex. B-6 | dye cyan B-1 | 23.4 | 3.28 | 0 |
| Com. Ex. B-7 | dye magenta B-1 | 23.7 | 3.33 | 0 |
| Com. Ex. B-8 | dye black B-1 | 23.2 | 3.25 | 0 |
| Com. Ex. B-9 | dye black B-1 | 26.9 | 9.78 | 0 |
| Com. Ex. B-10 | dye yellow B-1 | 26.5 | 10.20 | 0 |
| Com. Ex. B-11 | dye magenta B-1 | 28.0 | 10.98 | 0 |
| Com. Ex. B-12 | dye cyan B-1 | 27.4 | 9.98 | 0 |

Flowingly, ink sets of Examples and Comparative Examples are shown in Table 2B.

TABLE 2B

|  | Ink Set | Black Ink | Cyan Ink | Magenta Ink | Yellow Ink |
| --- | --- | --- | --- | --- | --- |
| Ex. 1 | ink set B-1 | Pro. Ex. 1 | Pro. Ex. 4 | Pro. Ex. 3 | Pro. Ex. 2 |
| Ex. 2 | ink set B-2 | Pro. Ex. 8 | Pro. Ex. 5 | Pro. Ex. 6 | Pro. Ex. 7 |
| Ex. 3 | ink set B-3 | Pro. Ex. 1 | Pro. Ex. 9 | Pro. Ex. 10 | Pro. Ex. 11 |
| Ex. 4 | ink set B-4 | Pro. Ex. 8 | Pro. Ex. 9 | Pro. Ex. 6 | Pro. Ex. 2 |
| Ex. 5 | ink set B-5 | Pro. Ex. 8 | Pro. Ex. 4 | Pro. Ex. 3 | Pro. Ex. 7 |
| Com. Ex. 1 | Com. set B-1 | Com. Ex. 4 | Com. Ex. 1 | Com. Ex. 2 | Com. Ex. 3 |
| Com. Ex. 2 | Com. set B-2 | Com. Ex. 8 | Com. Ex. 6 | Com. Ex. 7 | Com. Ex. 5 |
| Com. Ex. 3 | Com. set B-3 | Com. Ex. 9 | Com. Ex. 12 | Com. Ex. 11 | Com. Ex. 10 |

The production of the recording medium for inkjet recording will be illustrated below.

<Production of Base Paper>

Production Example 1 Of Base Paper

-Preparation of Support 1-

| | |
| --- | --- |
| LBKP | 71.23% by mass |
| NBKP | 17.81% by mass |
| precipitated calcium carbonate, TP121 (a manufacturer: Okutama Kogyo Co., Ltd.) | 8.90% by mass |
| alumminum sulfate | 0.89% by mass |
| amphoterism starch, Cato 3210 (a manufacturer: Nippon NSC Ltd.) | 0.89% by mass |
| neutral rosin sizing agent, NeuSize M-10 (a manufacturer: Harima Chemicals, Inc.) | 0.27% by mass |
| retention aid, NR-11LS (a manufacturer: Hymo Co., Ltd.) | 0.01% by mass |

A 0.3% slurry of the above formula was processed by means of a fortlinear paper machine, and the thus obtained sheet was subjected to a machine calendering treatment, to thereby yield Support 1 having basis weight of 79 g/m². Note that, at the time the slurry was processed to make a sheet, a size-press treatment was performed, and an aqueous solution of oxidized starch was applied onto each face of the sheet at 1.0 g/m² in dry basis.

Embodiment 1 of Recording Medium

As a pigment, 70 parts by mass of kaolin (refractive index: 1.6, a product name: Ultra White 90, a manufacturer: Engelhard Corporation) having a particle size distribution such that 97% by mass of the particles have a particle diameter of 2 μm or less, and 30 part by mass of heavy calcium carbonate (limestone powder) having an average particle diameter of 1.1 μm, as a binder, 8 parts by mass of styrene-butadiene copolymer emulsion having a glass-transition temperature of −5° C., and 1 part by mass of phosphate starch, as an assistant, and 0.5 parts by mass of calcium stearate were mixed, and water was added to this mixture to thereby yield a coating liquid having solids content of 60% by mass.

The thus obtained coating liquid was applied on the both faces of the support prepared in Production Example 1 of Base paper so as to have a coating thickness of 1 μm per face. Thereafter, the coated support was dried by hot air, and then was subjected to a super calendaring treatment to thereby obtain Recording Medium 1.

Embodiment 2 of Recording Medium

Recording Medium 2 was prepared in the same manner as in Embodiment 1 of Recording Medium, provided that a coating thickness was changed to be 10 μm per face.

Embodiment 3 of Recording Medium

Recording Medium 3 was prepared in the same manner as in Embodiment 1 of Recording Medium, provided that the inorganic pigment contained in the coating liquid was changed to 100 parts by mass (solids content) of TA-100 (anatase type titanium oxide, a refractive index: 2.5, a manufacturer: Fuji Titanium Industry Co., Ltd.).

Embodiment 4 of Recording Medium

Recording Medium 4 was prepared in the same manner as in Embodiment 1 of Recording Medium, provided that the inorganic pigment contained in the coating liquid was changed to 100 parts by mass of TP-221 (precipitated calcium carbonate, a refractive index: 1.6 (1.59), a manufacturer: Okutama Kogyo Co., Ltd.).

Embodiment 5 of Recording Medium

A coated paper for gravure printing, Space DX, (containing kaolin having a refractive index of 1.6 and calcium carbonate having a refractive index of 1.6, a manufacturer: Nippon Paper Group, Inc.) was used as Recording Medium 5.

Embodiment 6 of Recording Medium

A coated paper for electrophotography, POD Gloss, (containing kaolin having a refractive index of 1.6 and calcium carbonate having a refractive index of 1.6, a manufacturer: Oji Paper Co., Ltd.) was used as Recording Medium 6.

Embodiment 7 of Recording Medium

A surface of the coated paper for electrophotography, POD Gloss, (containing kaolin having a refractive index of 1.6 and calcium carbonate having a refractive index of 1.6, a manufacturer: Oji Paper Co., Ltd.) was polished with a wrapping paper twenty times so as to reduce a thickness of the coating layer to be 5.1 μm. Recording Medium 7 was prepared in this manner.

Next, the thus obtained Recording Media 1-7 were observed under a scanning electron microscopy (FE-SEM S-4200, manufactured by Hitachi, Ltd.), the observed images were translated into 2 digits. From the observed images, it was confirmed that the diameter of pore was 1 μm or less, and that the area of the pores occupied in the surface of the recording medium was 40% or less. Namely, all of Recording Media 1-7 satisfied the conditions required for the pores of the barrier layer.

Examples A-1 to A-6, and Comparative Examples A-1 to A-2

As shown in Table 3A, printing was performed at resolution of 600 dpi by using the ink and ink set shown in Table 1A and Table 2A, and a recording medium, by means of a prototype of a drop-on-demand printer with a nozzle having a nozzle resolution of 384. The amount of ink deposit was controlled by setting the maximum droplet size to be 18 pl, and the total amount of secondary color to be 140%. Solid images and characters were printed in the following manner, provided that a total amount of ink for 300 dots square did not exceed 15 g/m² at the time of printing the solid images. Quality and reliability of the thus obtained images were evaluated in the following manner. The results are presented in Table 3A.

(1) Image Quality

1. Strike-Through

Back sides of green solid images of Examples and Comparative Examples were subjected to the measurements of image density, and the density of strike-through was determined by a value which took density of background from the obtained value.

[Evaluation Criteria]

A: 0.1 or less of strike-through density, and an image is uniformly printed without causing any slight strike-through.

B: 0.15 or less of strike-through density, and an image is uniformly printed without causing any slight strike-through.

C: 0.15 or less of strike-through density, but a slight strike-through is observed.

D: Significant strike-through is observed.

Note that, the image of the evaluation criteria "D" does not acceptable quality for inkjet printing image.

2. Beading

Green solid images of Examples and Comparative Examples were observed with naked eyes for the existence and degree of beading, and then evaluated based on the following criteria.

[Evaluation Criteria]

5: an image is uniformly printed without any occurrence of beading.

4: Slight occurrence of beading is observed, but the degree of beading is something which is not noticeable.

3: Occurrences of beading are observed, but the degree of beading is something which does not adversely affect the quality of image.

2: Occurrences of beading are clearly observed.

1: Significant occurrences of beading are observed.

3. Evaluation of Image Density

Magenta solid images of Examples and Comparative Examples were subjected to the measurement of optical density by means of X-Rite 932, and were evaluated by the following criteria.

[Evaluation Criteria]

A: 1.6 or more of magenta image density.

B: 1.3 or more of magenta image density.

C: 1.0 or more of magenta image density.

D: Less than 1.0 of magenta image density.

Note that, the image of the evaluation criteria "D" does not acceptable quality for inkjet printing image.

4. Evaluation of Glossiness

Images of Examples and Comparative Examples were observed with naked eyes for the degree of glossiness, and then were evaluated based on the following criteria.

[Evaluation Criteria]

A: High glossiness is observed

B: Glossiness is observed.

C: No glossiness is observed.

Note that, the image of the evaluation criteria "C" does not acceptable quality for inkjet printing image.

(2) Image Reliability

<Evaluation of Abrasion Resistance>

As samples for evaluation, a square image (3 cm×3 cm) was prepared in each color of black, cyan, magenta, yellow, red, green, and blue. After 24 hours from the printing, white cotton cloth (JIS L 0803, Cotton No. 3) was attached to the sample with a double coated urethane form tape 4016 (a manufacturer: Sumitomo 3M Limited, t=1.6), and the sample was rubbed with the white cotton cloth for five times by means of Clock Meter (CM-1 type). Thereafter, color density of the coloring agent attached to the white cotton cloth was measured by means of Spectrodensitometer (X-RITE, Model-938).

[Evaluation Criteria]
A: The color density of the coloring agent attached to the cotton cloth is less than 0.05
B: The color density of the coloring agent attached to the cotton cloth is 0.05 or more, but less than 0.1.
C: The color density of the coloring agent attached to the cotton cloth is 0.1 or more.

Note that, the image of the evaluation criteria "C" does not acceptable quality for inkjet printing image.

TABLE 3A

| Ink Set | Coloring agent | Medium | Strike through | Beading | Density | Glossiness | Abration resistance |
|---|---|---|---|---|---|---|---|
| Ex. A-1 | A-1 | pigment | Medium 1 | B | 4.5 (A) | B | B | B |
| Ex. A-2 | A-2 | pigment | Medium 3 | A | 4.5 (A) | B | B | B |
| Ex. A-3 | A-3 | pigment | Medium 5 | A | 4.0 (B) | B | B | B |
| Ex. A-4 | A-4 | pigment | Medium 6 | A | 4.0 (B) | B | B | B |
| Ex. A-5 | A-5 | pigment | Medium 7 | A | 4.0 (B) | B | B | B |
| Com. A-1 | Com. A-1 | pigment | Medium 6 | C | 2.0 (C) | D | C | D |
| Com. A-2 | Com. A-2 | dye | Medium 7 | C | 1.0 (D) | C | D | C |
| Ex. A-6 | A-5 | pigment | Medium 2 | B | 4.0 (B) | B | B | B |

Examples B-1 to B-6, and Comparative Examples B-1 to B-3

As shown in Table 3B, printing was performed at resolution of 600 dpi by using the ink and ink set shown in Table 1B and Table 2B, and a recording medium, by means of a prototype of a drop-on-demand printer with a nozzle having a nozzle resolution of 384. The amount of ink deposit was controlled by setting the maximum droplet size to be 18 pl, and the total amount of secondary color to be 140%. Solid images and characters were printed in the same manner as in Examples A-1 to A-6, and Comparative Examples A-1 and A-2, so that a total amount of ink for 300 dot square did not exceed 15 g/m² at the time of printing the solid images. Quality and reliability of the thus obtained images were evaluated in the following manner. The results are presented in Table 3B.

TABLE 3B

| Ink Set | Coloring agent | Medium | Strike through | Beading | Density | Glossiness | Abration resistance |
|---|---|---|---|---|---|---|---|
| Ex. B-1 | B-1 | pigment | Medium 1 | A | 4.5 (A) | A | B | A |
| Ex. B-2 | B-2 | pigment | Medium 3 | A | 4.5 (A) | A | A | A |
| Ex. B-3 | B-3 | pigment | Medium 5 | A | 4.0 (B) | A | B | B |
| Ex. B-4 | B-4 | pigment | Medium 6 | A | 4.0 (B) | A | A | A |
| Ex. B-5 | B-5 | pigment | Medium 7 | A | 4.0 (B) | A | A | A |
| Com. B-1 | Com. B-1 | pigment | Medium 6 | C | 2.0 (C) | C | D | C |
| Com. B-2 | Com. B-2 | dye | Medium 7 | C | 1.0 (D) | D | C | C |
| Com. B-3 | Com. B-3 | pigment | Medium 5 | B | 3.0 (C) | C | C | C |
| Ex. B-6 | B-5 | pigment | Medium 2 | B | 4.0 (B) | B | B | B |

Figure 3:
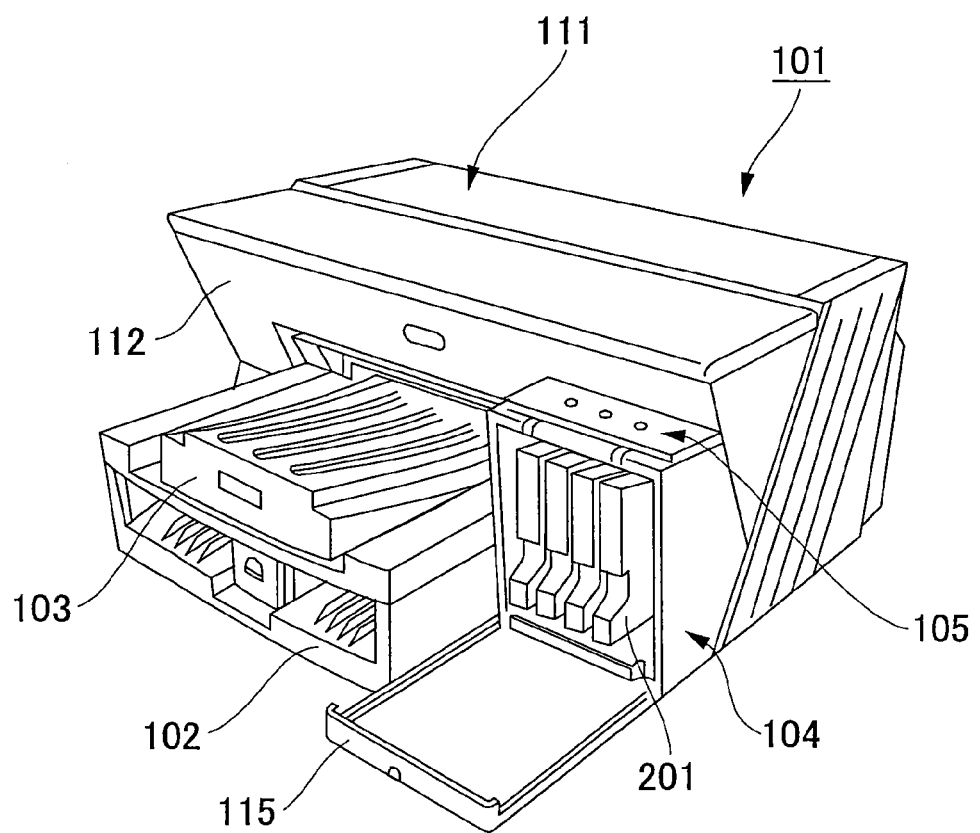
FIG. 3 shows a perspective view of an inkjet recording apparatus, wherein a section where an ink cartridge is loaded is shown with a cover thereof open.

(3) Reliability for Clogging (Ejecting Stability)
<Evaluation 1> Evaluation of Reliability for Clogging at Interval Printing Printing was performed on MY PAPER manufactured by NBS Ricoh Co., Ltd., by means of a printer shown in FIG. 3. The printing was performed by using each of a yellow ink, a magenta ink, a cyan ink and a black ink at printing duty of 100%, and using a chart which had 5% of a printing area for each ink within a total area of the paper, as a printing pattern. The printing conditions were of one-pass printing at a recording concentration of 360 dpi.

By using the ink media sets of Examples B1 to B5 and Comparative Examples B-1 to B3, Evaluation 1 and Evaluation 2 were sequentially performed.

The interval printing was performed in such manner that the above-mentioned chart was continuously printed for 20 pieces, and then the printer was rested without ejecting for 20 hours. This process was repeated 50 times, and after 1000 prints in total, the chart was printed once more, and then this print was evaluated with naked eyes on 5% solid image part in the chart, whether or not lines, whiteout, or ejection disturbance was present in the solid image.

[Evaluation Criteria]
A: No lines, whiteout, or ejection disturbance is observed in the solid image.
B: Lines, whiteout, or ejection disturbance is slightly observed in the solid image.
C: Lines, whiteout, or ejection disturbance is slightly observed at first scan.

TABLE 4B

| | Reliability for clogging |
|---|---|
| Example B-1 | A |
| Example B-2 | A |
| Example B-3 | A |
| Example B-4 | A |
| Example B-5 | A |

TABLE 4B-continued

| | Reliability for clogging |
|---|---|
| Comparative Example B-1 | C |
| Comparative Example B-2 | C |
| Comparative Example B-3 | B |

<Evaluation 2> Reliability for Clogging when Standing after Continuous Printing

By using the ink medium sets of Examples B1 to B5 and Comparative Examples B-1 to B3, reliability for clogging was evaluated.

The results are shown in Tables 5B, 6B, and 7B.

The evaluation was carried out under various environments, namely environment 1 (23° C., 50% RH), environment 2 (10° C., 15% RH), and environment 3 (27° C., 80% RH), by printing on MY PAPER manufactured by NBS Ricoh Co., Ltd. by means of a printer shown in FIG. 3. As a printing pattern, a standard test pattern J6 chart made by Japanese Electron Industry Development Association (JEIDA) was used, and the printing was continuously performed at recording density of 360 dpi at one-pass printing on 500 papers. Thereafter, it was stand for 20 hours, and then a printing was performed in the same manner to the manner of before standing 20 hours. The resulted images were evaluated with naked eyes whether or not lines, whiteout, or ejection disturbance was present in the solid image.

[Evaluation Criteria]
A: No lines, whiteout, or ejection disturbance is observed in the solid image.
B: Lines, whiteout, or ejection disturbance is slightly observed in the solid image.
C: Lines, whiteout, or ejection disturbance is slightly observed at first scan.

TABLE 5B

| Emvironment 1 (23° C., 50% RH) | Reliability for clogging |
| --- | --- |
| Example B-1 | A |
| Example B-2 | A |
| Example B-3 | A |
| Example B-4 | A |
| Example B-5 | A |
| Comparative Example B-1 | C |
| Comparative Example B-2 | C |
| Comparative Example B-3 | B |

TABLE 6B

| Emvironment 2 (10° C., 15% RH) | Reliability for clogging |
| --- | --- |
| Example B-1 | A |
| Example B-2 | A |
| Example B-3 | A |
| Example B-4 | A |
| Example B-5 | A |
| Comparative Example B-1 | C |
| Comparative Example B-2 | C |
| Comparative Example B-3 | B |

TABLE 7B

| Emvironment 3 (27° C., 80% RH) | Reliability for clogging |
| --- | --- |
| Example B-1 | A |
| Example B-2 | A |
| Example B-3 | A |
| Example B-4 | A |
| Example B-5 | A |
| Comparative Example B-1 | C |
| Comparative Example B-2 | C |
| Comparative Example B-3 | B |

Industrial Applicability

The ink for inkjet recording of the present invention provides recording images of high optical density, provides highly uniform images without causing beading or the like in a slid image, and has excellent reliability for clogging and long-term storage stability, by using in combination with a recording medium having a texture close to that of a recording medium for commercial printings. Accordingly, the ink for inkjet recording of the present invention can be suitable applied for an ink set for inkjet recording, an ink medium set for inkjet recording, an ink cartridge, an inkjet recording apparatus, and an inkjet recording method.

The inkjet recording apparatus and inkjet recording method of the present invention can be suitably adapted for various recording in accordance with inkjet recording, for example, a inkjet recording printer, a facsimile device, a photocopying machine, a complex machine functioning a printer, facsimile, and photocopier, and the like.

We claim:

1. An ink for inkjet recording, comprising:
water;
a water-soluble organic solvent;
a water-dispersible resin;
a fluorochemical surfactant or derivative thereof; and
a coloring agent comprising a pigment,
wherein the ink for inkjet recording has a surface tension of 20 mN/m to 35 mN/m at 25° C., and a viscosity of 5 mPa·s or more at 25° C., a total amount of the water-dispersible resin and the coloring agent in the ink for inkjet recording is 5% by mass to 40% by mass, and a mass ratio A/B of the water-dispersible resin A to the coloring agent B is 0.5 to 4,
wherein the ink for inkjet recording is applied for a recording medium for inkjet recording which comprises a support comprising a cellulose pulp, and one or more barrier layer disposed on at least one face of the support,
wherein the barrier layer comprises 30% by mass or more of an inorganic pigment having a refractive index of 1.5 or more, excluding aluminum hydrate, and 10% by mass or less of an inorganic pigment having a refractive index of less than 1.5, and
the water-dispersible resin is at least one member selected from the group consisting of an anionic self-emulsified polyurethane ether resin emulsion and an acryl-silicone resin emulsion.

2. The ink for inkjet recording according to claim 1, wherein the water-dispersible resin is a mixture an anionic self-emulsified polyurethane ether resin emulsion and an acryl-silicone resin emulsion.

3. The ink for inkjet recording according to claim 1, wherein the surfactant is a compound expressed by the following structural formula 1:

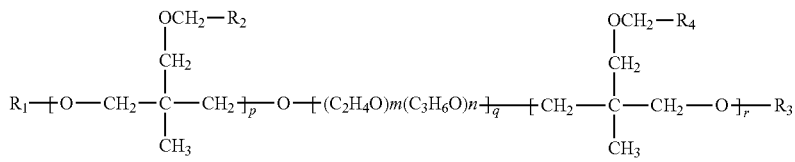

where each of $R_1$ and $R_3$ denotes either a hydrogen atom or a group comprising a fluorine atom, each of $R_2$ and $R_4$ denotes a group comprising a fluorine atom, each of m, n, p, q and r denotes an integer, and at least one of m, n, p, q, and r is greater than zero.

4. An ink for inkjet recording, comprising:
water;
a water-soluble organic solvent;
a water-dispersible resin;
a coloring agent; and
a solid moisture retainer comprising a dipeptide,
wherein the ink for inkjet recording has a surface tension of 20 mN/m to 35 mN/m at 25° C., and a viscosity of 5 mPa·s or more at 25° C.,
wherein the ink for inkjet recording is applied for a recording medium for inkjet recording which comprises a support comprising a cellulose pulp, and one or more barrier layer disposed on at least one face of the support,
wherein the barrier layer comprises 30% by mass or more of an inorganic pigment having a refractive index of 1.5 or more, excluding aluminum hydrate, and 10% by mass or less of an inorganic pigment having an refractive index of less than 1.5, and
the water-dispersible resin is at least one member selected from the group consisting of an anionic self-emulsified polyurethane ether resin emulsion and an acryl-silicone resin emulsion.

5. The ink for inkjet recording according to claim 4, wherein the dipeptide is at least one selected from the group consisting of alanyl glutamine, glycyl glutamine, bisalanyl cysteine, and bisglycyl cysteine.

6. The ink for inkjet recording according to claim 1, wherein the water-soluble organic solvent is at least one selected from the group consisting of glycerin, trimethylol propane, ethylene glycol, diethylene glycol, triethylene glycol, propylene glycol, dipropylene glycol, tripropylene glycol, 2-methyl-1,3-propanediol, 1,3-butanediol, 2,3-butanediol, 1,4-butanediol, 2-methyl-1,3-butanediol, 3-methyl-1,3-butanediol, 1,5-pentanediol, 1,6-hexanediol, 2-methyl-2,4-hexanediol, 2-pyrrolidone, N-methyl-2-pyrrolidone, N-hydroxyethyl-2-pyrrolidone, tetramethyl urea, and urea.

7. An ink set for inkjet recording, comprising:
a black ink; and
a color ink,
wherein each of the black ink and the color ink is an ink for inkjet recording, which comprises:
water;
a water-soluble organic solvent;
a water-dispersible resin;
a fluorochemical surfactant or derivative thereof; and
a coloring agent comprising a pigment,
wherein the ink for inkjet recording has a surface tension of 20 mN/m to 35 mN/m at 25° C., and a viscosity of 5 mPa·s or more at 25° C., a total amount of the water-dispersible resin and the coloring agent in the ink for inkjet recording is 5% by mass to 40% by mass, and a mass ratio A/B of the water-dispersible resin A to the coloring agent B is 0.5 to 4,
wherein the ink for inkjet recording is applied for a recording medium for inkjet recording which comprises a support comprising a cellulose pulp, and one or more barrier layer disposed on at least one face of the support,
wherein the barrier layer comprises 30% by mass or more of an inorganic pigment having a refractive index of 1.5 or more, excluding aluminum hydrate, and 10% by mass or less of an inorganic pigment having a refractive index of less than 1.5, and
the water-dispersible resin is at least one member selected from the group consisting of an anionic self-emulsified polyurethane ether resin emulsion and an acryl-silicone resin emulsion.

8. An ink media set for inkjet recording, comprising:
a recording medium for inkjet recording; and
an ink for inkjet recording, which comprises:
water;
a water-soluble organic solvent;
a water-dispersible resin;
a fluorochemical surfactant or derivative thereof; and
a coloring agent comprising a pigment,
wherein the ink for inkjet recording has a surface tension of 20 mN/m to 35 mN/m at 25° C., and a viscosity of 5 mPa·s or more at 25° C., a total amount of the water-dispersible resin and the coloring agent in the ink for inkjet recording is 5% by mass to 40% by mass, and a mass ratio A/B of the water-dispersible resin A to the coloring agent B is 0.5 to 4,
wherein the ink for inkjet recording is applied for a recording medium for inkjet recording which comprises a support comprising a cellulose pulp, and one or more barrier layer disposed on at least one face of the support,
wherein the barrier layer comprises 30% by mass or more of an inorganic pigment having a refractive index of 1.5 or more, excluding aluminum hydrate, and 10% by mass or less of an inorganic pigment having a refractive index of less than 1.5,
wherein the recording medium for inkjet recording comprises the support comprising the cellulose pulp, and the one or more barrier layer disposed on at least the one face of the support,
wherein the barrier layer comprises 30% by mass or more of the inorganic pigment having a refractive index of 1.5 or more, excluding aluminum hydrate, and 10% by mass or less of the inorganic pigment having an refractive index of less than 1.5, and
the water-dispersible resin is at least one member selected from the group consisting of an anionic self-emulsified polyurethane ether resin emulsion and an acryl-silicone resin emulsion.

9. The ink media set for inkjet recording according to claim 8, wherein the barrier layer has a thickness of 10 μm or less.

10. The ink media set for inkjet recording according to claim 8, wherein the barrier layer has pores having a diameter of 1 μm or less, and a ratio of an area of the pores occupying in the face of the recording medium for inkjet recording is 40% or less.

11. An ink cartridge, comprising:
a container; and
an ink for inkjet recording in the container,
wherein the ink comprises:
water;
a water-soluble organic solvent;
a water-dispersible resin;
a fluorochemical surfactant or derivative thereof; and
a coloring agent comprising a pigment,
wherein the ink for inkjet recording has a surface tension of 20 mN/m to 35 mN/m at 25° C., and a viscosity of 5 mPa·s or more at 25° C., a total amount of the water-dispersible resin and the coloring agent in the ink for inkjet recording is 5% by mass to 40% by mass, and a mass ratio A/B of the water-dispersible resin A to the coloring agent B is 0.5 to 4,
wherein the ink for inkjet recording is applied for a recording medium for inkjet recording which comprises a support comprising a cellulose pulp, and one or more barrier layer disposed on at least one face of the support,
wherein the barrier layer comprises 30% by mass or more of an inorganic pigment having a refractive index of 1.5 or more, excluding aluminum hydrate, and 10% by mass or less of an inorganic pigment having a refractive index of less than 1.5, and
the water-dispersible resin is at least one member selected from the group consisting of an anionic self-emulsified polyurethane ether resin emulsion and an acryl-silicone resin emulsion.

12. An inkjet recording apparatus, comprising:
an ink ejecting unit configured to apply a stimulus to an ink for inkjet recording, and to eject the ink so as to record an image on an recording medium; and
an ink media set for inkjet recording, which comprises:
the recording medium for inkjet recording; and
the ink for inkjet recording, which comprises:
water;
a water-soluble organic solvent;
a water-dispersible resin;
a fluorochemical surfactant or derivative thereof; and
a coloring agent comprising a pigment,
wherein the ink for inkjet recording has a surface tension of 20 mN/m to 35 mN/m at 25° C., and a viscosity of 5 mPa·s or more at 25° C., a total amount of the water-dispersible resin and the coloring agent in the ink for inkjet recording is 5% by mass to 40% by mass, and a mass ratio A/B of the water-dispersible resin A to the coloring agent B is 0.5 to 4,
wherein the ink for inkjet recording is applied for a recording medium for inkjet recording which comprises a support comprising a cellulose pulp, and one or more barrier layer disposed on at least one face of the support,
wherein the barrier layer comprises 30% by mass or more of an inorganic pigment having a refractive index of 1.5 or more, excluding aluminum hydrate, and 10% by mass or less of an inorganic pigment having a refractive index of less than 1.5,
wherein the recording medium for inkjet recording comprises the support comprising the cellulose pulp, and the one or more barrier layer disposed on at least the one face of the support,
wherein the barrier layer comprises 30% by mass or more of the inorganic pigment having a refractive index of 1.5 or more, excluding aluminum hydrate, and 10% by mass or less of the inorganic pigment having an refractive index of less than 1.5, and
the water-dispersible resin is at least one member selected from the group consisting of an anionic self-emulsified polyurethane ether resin emulsion and an acryl-silicone resin emulsion.

13. The inkjet recording apparatus according to claim 12, wherein the stimulus is at least one selected from the group consisting of heat, pressure, vibration, and light.

14. The inkjet recording apparatus according to claim 12, wherein the ink ejecting unit ejects the ink on the recording medium so that an ink deposited amount on the recording medium to be 15 g/m² or less.

15. The inkjet recording apparatus according to claim 12, further comprising a member configured to turn over a side of the recording medium so as to enable a double-side printing.

16. The ink for inkjet recording according to claim 4, wherein
the water-dispersible resin is a mixture an anionic self-emulsified polyurethane ether resin emulsion and an acryl-silicone resin emulsion.

17. The ink for inkjet recording according to claim 7, wherein
the water-dispersible resin is a mixture an anionic self-emulsified polyurethane ether resin emulsion and an acryl-silicone resin emulsion.

18. The ink media set for inkjet recording according to claim 8, wherein
the water-dispersible resin is a mixture an anionic self-emulsified polyurethane ether resin emulsion and an acryl-silicone resin emulsion.

19. The inkjet recording apparatus according to claim 11, wherein
the water-dispersible resin is a mixture an anionic self-emulsified polyurethane ether resin emulsion and an acryl-silicone resin emulsion.

20. The inkjet recording apparatus according to claim 12, wherein
the water-dispersible resin is a mixture an anionic self-emulsified polyurethane ether resin emulsion and an acryl-silicone resin emulsion.

\* \* \* \* \*